US012697604B2

(12) United States Patent
Vjunov et al.

(10) Patent No.: US 12,697,604 B2
(45) Date of Patent: Aug. 4, 2026

(54) AUTOMOTIVE 3-WAY CATALYST SYSTEM CONTAINING A TAIL PIPE CATALYST

(71) Applicant: BASF Mobile Emissions Catalysts LLC, Iselin, NJ (US)

(72) Inventors: Aleksei Vjunov, Iselin, NJ (US); Michel Deeba, East Brunswick, NJ (US)

(73) Assignee: BASF Mobile Emissions Catalysts LLC, Iselin, NJ (US)

(*) Notice: Subject to any disclaimer, the term of this patent is extended or adjusted under 35 U.S.C. 154(b) by 1182 days.

(21) Appl. No.: 17/595,320

(22) PCT Filed: Jun. 17, 2020

(86) PCT No.: PCT/US2020/038035
§ 371 (c)(1),
(2) Date: Nov. 15, 2021

(87) PCT Pub. No.: WO2020/257220
PCT Pub. Date: Dec. 24, 2020

(65) Prior Publication Data
US 2022/0212169 A1 Jul. 7, 2022

Related U.S. Application Data

(60) Provisional application No. 62/863,983, filed on Jun. 20, 2019.

(30) Foreign Application Priority Data

Jul. 18, 2019 (EP) .................................... 19186977

(51) Int. Cl.
| | |
|---|---|
| *B01J 23/42* | (2006.01) |
| *B01D 53/94* | (2006.01) |
| *B01J 23/10* | (2006.01) |
| *B01J 23/44* | (2006.01) |
| *B01J 23/46* | (2006.01) |
| *B01J 23/755* | (2006.01) |
| *B01J 35/00* | (2024.01) |
| *B01J 35/04* | (2006.01) |
| *B01J 35/57* | (2024.01) |
| *F01N 3/10* | (2006.01) |
| *F01N 3/28* | (2006.01) |
| *B01J 35/56* | (2024.01) |

(52) U.S. Cl.
CPC ............ *B01J 23/42* (2013.01); *B01D 53/945* (2013.01); *B01D 53/9454* (2013.01); *B01D 53/9477* (2013.01); *B01J 23/10* (2013.01); *B01J 23/44* (2013.01); *B01J 23/464* (2013.01); *B01J 23/755* (2013.01); *B01J 35/19* (2024.01); *B01J 35/57* (2024.01); *F01N 3/101* (2013.01); *F01N 3/2828* (2013.01);

*F01N 3/2842* (2013.01); *F01N 3/2885* (2013.01); *B01D 2255/1021* (2013.01); *B01D 2255/1023* (2013.01); *B01D 2255/1025* (2013.01); *B01D 2255/2042* (2013.01); *B01D 2255/2065* (2013.01); *B01D 2255/20753* (2013.01); *B01D 2255/20761* (2013.01); *B01D 2255/407* (2013.01); *B01D 2255/9022* (2013.01); *B01D 2255/904* (2013.01); *B01D 2255/908* (2013.01); *B01J 35/56* (2024.01); *F01N 2370/02* (2013.01)

(58) Field of Classification Search
CPC ... B01J 23/42; B01J 23/10; B01J 23/44; B01J 23/464; B01J 23/755; B01J 35/19; B01J 35/57; B01D 53/945; B01D 53/9454; B01D 53/9477; F01N 3/101; F01N 3/2828; F01N 3/2842; F01N 3/2885
See application file for complete search history.

(56) References Cited

U.S. PATENT DOCUMENTS

| | | | |
|---|---|---|---|
| 5,849,251 A * | 12/1998 | Timko | ...................... F01N 3/28 181/227 |
| 8,815,189 B2 * | 8/2014 | Arnold | ............... B01D 46/2429 60/299 |
| 2001/0036432 A1 * | 11/2001 | Hu | ......................... F01N 13/009 502/328 |
| 2002/0131914 A1 | 9/2002 | Sung | |
| 2016/0158699 A1 | 6/2016 | Cavataio et al. | |
| 2019/0168161 A1 | 6/2019 | Cravillon et al. | |

OTHER PUBLICATIONS

European Search Report for EP Patent Application No. 19186977.5, Issued on Jan. 28, 2020, 3 pages.
Heck, et al., "The Preparation of Catalytic Materials: Carriers, Active Components and Monolithic Substrates", Catalytic Air Pollution Control: Commercial Technology, Second Edition, Jul. 24, 2002, pp. 18-19.
International Search Report dated Aug. 3, 2020, PCT/US2020/038035.

* cited by examiner

*Primary Examiner* — Yong L Chu
(74) *Attorney, Agent, or Firm* — DLA Piper LLP (US)

(57) ABSTRACT

The disclosure relates to an automotive catalyst system which can be used to selectively reduce carbon monoxide. The system comprises a first close coupled three-way conversion catalytic article in fluid communication with an engine exhaust outlet, a catalytic article located downstream of and in fluid communication with the first close coupled three-way conversion catalytic article, a tail-pipe catalytic article arranged downstream in fluid communication and 1.0 to 10 feet away from the catalytic article at a position chosen from before or behind a resonator, before or after a muffler, between the resonator and the muffler, inside the muffler, inside the resonator, and at a tail pipe end.

22 Claims, 9 Drawing Sheets

CC + UF + Blank substrate
CC + UF + Catalyst A
CC + UF + Catalyst B
CC + UF + Catalyst C
CC + UF + Catalyst D
Speed

AUTOMOTIVE 3-WAY CATALYST SYSTEM CONTAINING A TAIL PIPE CATALYST

CROSS-REFERENCE TO RELATED APPLICATIONS

This application is a national stage filing under 35 U.S.C. § 371 of International Application No. PCT/US2020/038035, filed on Jun. 17, 2020, which claims the benefit of priority to U.S. Provisional Application No. 62/863,983, filed on Jun. 20, 2019, and to European Application No. 19186977.5, filed on Jul. 18, 2019; the disclosure of each of these applications are each incorporated herein by reference in their entirety.

FIELD OF THE INVENTION

The presently claimed invention relates to a catalyst system that is useful for the treatment of the exhaust gases to reduce contaminants contained therein. Particularly, the presently claimed invention relates to the catalyst system containing a tail pipe catalyst which can be used to selectively reduce carbon monoxide.

BACKGROUND OF THE INVENTION

The automotive catalysts such as three-way conversion (TWC) catalysts have been utilized in the treatment of the exhaust gas streams from the internal combustion engines for several years. The three-way conversion catalyst is typically known to oxidize unburnt hydrocarbon and carbon monoxide and reduce nitrogen oxides. Amongst the various pollutants, the elevated carbon monoxide level which is observed in the tail-pipe exhaust gas emission is still a problem for automobile manufacturers, as in recent years, government regulations of various countries, such as the USA, have placed strict restrictions on emission of carbon monoxide, i.e. the acceptable values for CO emission from the tailpipe are steadily decreasing. Thus, while the non-methane hydrocarbon (NMHC) and $NO_x$ values are often the primary focus of the catalyst, the CO mitigation feature is now becoming more and more prominent.

In the prior art, the use of a three-way catalyst comprising nickel or a combination of nickel and copper to reduce CO and other pollutants is disclosed. However, the practicality of such catalysts remains disputed as both nickel and copper can react with a support, such as alumina, to form nickel-aluminate and copper-aluminate, which in turn may affect the commercial success of such designs. The formation of the respective aluminate typically occurs during the severe aging conditions, which may cause deactivation of the catalyst. Further, the presence of a base metal may cause poisoning of the platinum group metal (PGM) and/or contribute to low thermal stability. Furthermore, there is a restriction on the use of nickel in the automotive catalyst in the European Union, because nickel in reaction with carbon monoxide can potentially form the toxic nickel tetracarbonyl.

Thus, there is a need for a catalyst system which can provide positive results across the whole emissions spectrum while selectively targeting CO emissions. Accordingly, it is an object of the present invention to provide an automobile catalyst system, in which an optimised additional catalyst is positioned away from the engine and is used along with a close coupled catalyst (CC)-1 and an underfloor catalyst/ close coupled catalyst-2 (CC-2) to minimize the impact of aging and maintain high PGM dispersion thereby reducing CO emission.

SUMMARY OF THE INVENTION

The presently claimed invention provides an automotive catalyst system comprising:
- a. a first close coupled three-way conversion catalytic article in fluid communication with an engine exhaust outlet, said three-way conversion catalytic article comprising i) a first platinum group metal supported on a support, and ii) a first substrate;
- b. a catalytic article located downstream of and in fluid communication with the first close coupled three-way conversion catalytic article, said catalytic article comprising i) a second platinum group metal supported on a support, and ii) a second substrate;
- c. a tail-pipe catalytic article comprising i) a third platinum group metal and/or a non-platinum group metal, supported on one of ceria-zirconia, ceria, ceria-alumina, lanthana-zirconia, alumina-zirconia, a mixture of alumina and ceria, and a mixture of alumina and ceria-zirconia; and ii) a third substrate, wherein the loading of the third platinum group metal is in the range of 1.0 to 20.0 $g/ft^3$, wherein the tail-pipe catalytic article (c) is arranged downstream in fluid communication and 1.0 to 10 feet away from the catalytic article (b) at a position selected from before or behind a resonator, before or after a muffler, between the resonator and the muffler, inside the muffler, inside the resonator, and at a tail pipe end.

In another aspect, the presently claimed invention provides a method of treating a gaseous exhaust stream comprising hydrocarbons, carbon monoxide, and nitrogen oxides, wherein the method comprises contacting the exhaust stream with the catalyst system according to the presently claimed invention.

In still another aspect, the presently claimed invention provides a method of reducing hydrocarbons, carbon monoxide, and nitrogen oxide levels in a gaseous exhaust stream, wherein the method comprises contacting the gaseous exhaust stream with the catalyst system according to the presently claimed invention.

In yet another aspect, the presently claimed invention provides use of the catalyst system according to presently claimed invention for purifying a gaseous exhaust stream comprising hydrocarbons, carbon monoxide, and nitrogen oxide.

BRIEF DESCRIPTION OF THE ACCOMPANYING DRAWINGS

In order to provide an understanding of embodiments of the invention, reference is made to the appended drawings, which are not necessarily drawn to scale, and in which reference numerals refer to components of exemplary embodiments of the invention. The drawings are exemplary only and should not be construed as limiting the invention. The above and other features of the presently claimed invention, their nature, and various advantages will become more apparent upon consideration of the following detailed description, taken in conjunction with the accompanying drawings:

FIG. 1A is a schematic representation of a reference catalyst system design and FIG. 1B is schematic representation of a catalyst system design in an exemplary configuration according to one embodiment of the presently claimed invention. FIG. 1C illustrates reference close-coupled catalytic article design, FIG. 1D illustrates an under-floor catalytic article design and FIG. 1E illustrates tail pipe catalytic article design.

FIGS. 2A, 2B, and 2C illustrate THC, CO and NO evolution in the FTP-72 test for the reference catalyst system.

DETAILED DESCRIPTION

Figure 1:
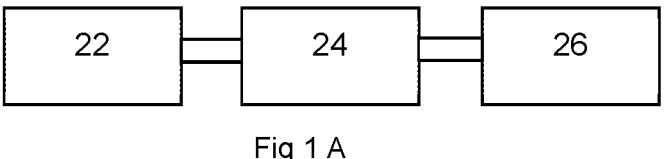

The presently claimed invention now will be described more fully hereafter. The presently claimed invention may be embodied in many different forms and should not be construed as limited to the embodiments set forth herein; rather, these embodiments are provided so that this presently claimed invention will be thorough and complete, and will fully convey the scope of the invention to those skilled in the art. No language in the specification should be construed as indicating any non-claimed element as essential to the practice of the disclosed materials and methods.

The use of the terms "a", "an", "the", and similar referents in the context of describing the materials and methods discussed herein (especially in the context of the following claims) are to be construed to cover both the singular and the plural, unless otherwise indicated herein or clearly contradicted by context.

The term "about" used throughout this specification is used to describe and account for small fluctuations. For example, the term "about" refers to less than or equal to ±5%, such as less than or equal to ±2%, less than or equal to ±1%, less than or equal to ±0.5%, less than or equal to ±0.2%, less than or equal to ±0.1% or less than or equal to ±0.05%. All numeric values herein are modified by the term "about," whether or not explicitly indicated. A value modified by the term "about" of course includes the specific value. For instance, "about 5.0" must include 5.0.

All methods described herein can be performed in any suitable order unless otherwise indicated herein or otherwise clearly contradicted by context. The use of any and all examples, or exemplary language (e.g., "such as") provided herein, is intended merely to better illustrate the materials and methods and does not pose a limitation on the scope unless otherwise claimed.

The present invention addresses the issue of controlling high CO emission from automobile and provides an automotive catalyst system in which an additional catalytic article is provided which can be located behind the first closed-couple and underfloor (CC+UF) catalysts or first closed-couple and second first closed-couple (CC1+CC2) catalyst configuration. Thus, instead of modifying the close-coupled catalyst(s) where multiple reactions compete for active sites, the presently claimed invention provides an effective solution to control CO emission by positioning a PGM and/or a non-PGM-containing catalyst away from the engine of the vehicle which thereby minimizes the impact of aging and maintain high PGM/non-PGM dispersion. Such a catalyst in the context of the present invention is referred to as tail-pipe catalyst which is arranged downstream and away from the catalytic article (CC2/UF) at a particular position such as before or behind a resonator, before or after a muffler, between the resonator and the muffler, inside the muffler, inside the resonator, and at a tail pipe end.

The tail-pipe catalytic article is found to selectively convert CO, primarily the breakthroughs during vehicle acceleration. In one embodiment, the tail-pipe catalyst is prepared using very low PGM loading (1-10 g/ft$^3$). i.e. the amount of PGM in tail-pipe catalyst is less than 10% of the total PGM present in the CC1 and CC2 (or UF) catalysts. In one embodiment, the present catalyst system though contains additional catalytic article (tail-pipe catalytic article) may have a total PGM loading equivalent to the PGM loading of the conventional catalyst system containing CC1 and UF/CC2. The platinum group metal utilized in the tail-pipe catalyst can be a minor fraction taken from the CC catalytic article. The PGM re-distribution or substitution, e.g. Pd for Pt, is performed at total system PGM cost equivalence. It is demonstrated that the tail-pipe catalyst has no negative impact on THC and NO emissions. The tail-pipe (TP) catalyst functions as a water-gas shift (WGS) catalyst and converts primarily CO and water to CO2 and hydrogen. The WGS catalyst is oxygen-independent and can, therefore, operate behind the TWC+TWC system that consumes the oxygen.

The primary focus of the presently claimed invention is to address the CO emissions during the typical driving cycle. This is especially important during rapid vehicle acceleration when the engine operates rich and the CC+UF system efficiency is not adequate to mitigate "hot emissions", e.g. CO break-through during vehicle acceleration when the engine may be operating under stoichiometric or rich mode, i.e. an air/fuel ratio of ≤1. The placement of tail-pipe is tied to the optimal operating temperature range for the WGS reaction that is taking place on the catalyst. Therefore, the placement can be anywhere between the immediate position behind the underfloor and the tip of the tail pipe, bed-temperature dependent. Furthermore, the tail-pipe catalyst can be placed before the muffler or even within the muffler assembly. The mode of operation and the chemistry determine the placement of tail-pipe catalyst.

In one embodiment, the automotive catalyst system comprises:

(a) a first close coupled three-way conversion catalytic article in fluid communication with an engine exhaust outlet, said three-way conversion catalytic article comprising: i) a first platinum group metal supported on a support, and ii) a first substrate;

(b) a catalytic article located downstream of and in fluid communication with the first close coupled three-way conversion catalytic article, said catalytic article comprising i) a second platinum group metal supported on a support, and ii) a second substrate;

(c) a tail-pipe catalytic article comprising i) a third platinum group metal and/or non-platinum group metal, supported on one of ceria-zirconia, ceria, ceria-alumina, lanthana-zirconia, alumina-zirconia, a mixture of alumina and ceria, and a mixture of alumina and ceria-zirconia; and ii) a third substrate, wherein the loading of the third platinum group metal, if present, is in the range of 1.0 to 10.0 g/ft³, wherein the tail-pipe catalytic article (c) is arranged downstream in fluid communication with and 1.0 to 10 feet away from the catalytic article (b) at a position selected from before or behind a resonator, before or after a muffler, between the resonator and the muffler, inside the muffler, inside the resonator, and at a tail pipe end.

In one embodiment, the amount of third platinum group metal is less than 10 wt. % of the total amount of the platinum group metal present in the catalyst system. i.e. the amount of third platinum group metal is less than 10 wt. % of the total amount of first, second and third platinum group metal. In one embodiment, the amount of third platinum group metal is less than 5.0 wt. % of the total amount of the platinum group metal present in the catalyst system.

The term "catalyst" or "catalytic article" or "catalyst article" refers to a component in which a substrate is coated with catalyst composition which is used to promote a desired reaction. In one embodiment, the catalytic article is a layered catalytic article. The term layered catalytic article refers to a catalytic article in which a substrate is coated with a PGM composition(s) in a layered fashion. These composition(s) may be referred to as washcoat(s).

The platinum group metal (PGM) refers to any component that includes a PGM (Ru, Rh, Os, Ir, Pd, and Pt). For example, the PGM may be in a metallic form, with zero valence, or the PGM may be in an oxide form. Reference to "PGM component" allows for the presence of the PGM in any valence state. The terms "platinum (Pt) component," "rhodium (Rh) component," "palladium (Pd) component," "iridium (Ir) component," "ruthenium (Ru) component," and the like refer to the respective platinum group metal compound, complex, or the like which, upon calcination or use of the catalyst, decomposes or otherwise converts to a catalytically active form, usually the metal or the metal oxide.

The term "NO$_x$" refers to nitrogen oxide compounds, such as NO and/or NO$_2$.

The platinum group metal(s) is supported or impregnated on a support material such as an alumina component, ceria component, zirconia component and an oxygen storage component. As used herein, "impregnated" or "impregnation" refers to permeation of the catalytic material into the porous structure of the support material.

A "support" in a catalytic material or catalyst composition or catalyst washcoat refers to a material that receives metals (e.g., PGMs), stabilizers, promoters, binders, and the like through precipitation, association, dispersion, impregnation, or other suitable methods. Exemplary supports include refractory metal oxide supports as described herein below.

"Refractory metal oxide supports" are metal oxides including, for example, bulk alumina, ceria, zirconia, titania, silica, magnesia, neodymia, and other materials known for such use, as well as physical mixtures or chemical combinations thereof, including atomically-doped combinations and including high surface area or activated compounds such as activated alumina.

Exemplary combinations of metal oxides include alumina-zirconia, alumina-ceria-zirconia, lanthana-alumina, lanthana-zirconia-alumina, baria-alumina, baria-lanthana-alumina, baria-lanthana-neodymia alumina, and alumina-ceria. Exemplary alumina includes large pore boehmite, gamma-alumina, and delta/theta alumina. Useful commercial alumina used as a starting material in exemplary processes include activated alumina(s), such as high bulk density gamma-alumina, low or medium bulk density large pore gamma-alumina, and low bulk density large pore boehmite and gamma-alumina. Such materials are generally considered as providing durability to the resulting catalyst.

"High surface area refractory metal oxide supports" refer specifically to support particles having pores larger than 20 Å and a wide pore distribution. High surface area refractory metal oxide supports, e.g., alumina support materials, also referred to as "gamma alumina" or "activated alumina," typically exhibit a BET surface area of fresh material in excess of 60 square meters per gram ("m²/g"), often up to about 300 m²/g or higher. Such activated alumina is usually a mixture of the gamma and delta phases of alumina, but may also contain substantial amounts of eta, kappa and theta alumina phases.

As used herein, the term "oxygen storage component" (OSC) refers to an entity that has a multi-valence state and can actively react with reductants such as carbon monoxide (CO) and/or hydrogen under reduction conditions and then react with oxidants such as oxygen or nitrogen oxides under oxidative conditions. Examples of oxygen storage components include ceria composites optionally doped with early transition metal oxides, particularly zirconia, lanthana, praseodymia, neodymia, niobia, europia, samaria, ytterbia, yttria, and mixtures thereof.

In one embodiment, the oxygen storage component comprises ceria-zirconia, ceria-zirconia-lanthana, ceria-zirconia-yttria, ceria-zirconia-lanthana-yttria, ceria-zirconia-neodymia, ceria-zirconia-praseodymia, ceria-zirconia-lanthana-neodymia, ceria-zirconia-lanthana-praseodymia, ceria-zirconia-lanthana-neodymia-praseodymia, or any combination thereof, wherein the amount of the oxygen storage component is 20 to 80 wt. % based on the total weight of the first or second layer. In one illustrative embodiment, the oxygen storage component comprises ceria-zirconia.

In one embodiment, the alumina component comprises alumina, lanthana-alumina, ceria-alumina, ceria-zirconia-alumina, zirconia-alumina, lanthana-zirconia-alumina, baria-alumina, baria-lanthana-alumina, baria-lanthana-neodymia-alumina, or combinations thereof.

In one embodiment, the oxygen storage component comprises ceria in an amount of 5.0 to 50.0 wt. % based on the total weight of the oxygen storage component. In one embodiment, the oxygen storage component of the first layer comprises ceria in an amount of 20.0 to 50.0 wt. % based on the total weight of the oxygen storage component. In one embodiment, the oxygen storage component of the second layer comprises ceria in an amount of 5.0 to 15.0 wt. % based on the total weight of the oxygen storage component In the context of the present invention, the term zirconia component is a zirconia-based support stabilized or promoted by lanthana or baria or ceria. The examples include lanthana-zirconia, and barium-zirconia.

In one embodiment, the ceria component comprises ceria or stabilized ceria with a cerium oxide content of at least 85% by weight, said ceria component optionally comprises a dopant selected from zirconia, yttria, praseodymia, lanthana, neodymia, samaria, gadolinia, alumina, titania, baria, strontia, and combinations thereof, wherein the amount of the dopant is 1.0 to 20.0 wt. %, based on the total weight of the ceria component.

In one embodiment, the first, second or third platinum group metal is platinum, palladium, rhodium or any combination thereof.

In one embodiment, the loading of the first platinum group metal is in the range of 50 to 300 g/ft³. In one embodiment, the loading of the second platinum group metal is 1.0 g/ft³ and 50.0 g/ft³. In one embodiment, the loading of the third platinum group metal is 1.0 to 10.0 g/ft³. In one embodiment, the loading of the third platinum group metal is 1.0 to 5.0 g/ft³. In one embodiment, the loading of the third platinum group metal is 3 g/ft³. In one embodiment, the third platinum group metal is platinum. In one embodiment, the third platinum group metal is palladium. In one embodiment, the third platinum group metal is rhodium.

In one embodiment, the automotive catalyst system comprises:

a) a first close coupled three-way conversion catalytic article in fluid communication with an engine exhaust outlet, said article comprising 50 to 300 g/ft³ of a first platinum group metal supported on a support, and a first substrate;

b) a catalytic article located downstream of and in fluid communication with the first close coupled three-way conversion catalytic article, said article comprising 1 g/ft³ to 50 g/ft³ of a second platinum group metal supported on a support, and a second substrate;

c) a tail-pipe catalytic article comprising i) 1.0 to 10 g/ft³ of a third platinum group metal supported on one of ceria-zirconia, ceria, ceria-alumina, lanthana-zirconia, alumina-zirconia, a mixture of alumina and ceria, and a mixture of alumina and ceria-zirconia; and ii) a third substrate, wherein the tail-pipe catalytic article (c) is arranged downstream in fluid communication and 1.0 to 10 feet away from the catalytic article (b) at a position selected from before or behind a resonator; before or after a muffler; between the resonator and the muffler; inside the muffler; inside the resonator; and at a tail pipe end.

In one embodiment, the automotive catalyst system comprises:

a) a first close coupled three-way conversion catalytic article in fluid communication with an engine exhaust outlet, said article comprising 50 to 300 g/ft³ of a first platinum group metal supported on a support, and a first substrate;

b) a catalytic article located downstream of and in fluid communication with the first close coupled three-way conversion catalytic article, said article comprising 1 g/ft³ to 50 g/ft³ of a second platinum group metal supported on a support, and a second substrate;

c) a tail-pipe catalytic article comprising i) 1.0 to 10 g/ft³ of a third platinum group metal supported on one of ceria-zirconia, ceria, ceria-alumina, lanthana-zirconia, alumina-zirconia, a mixture of alumina and ceria, and a mixture of alumina and ceria-zirconia; and ii) a third substrate, wherein the amount of third platinum group metal is less than 5.0 wt. % of the total amount of the platinum group metal present in the catalyst system, wherein the tail-pipe catalytic article (c) is arranged downstream in fluid communication and 1.0 to 10 feet away from the catalytic article (b) at a position selected from before or behind a resonator; before or after a muffler; between the resonator and the muffler; inside the muffler; inside the resonator; and at a tail pipe end.

In one embodiment, ceria-zirconia comprises 5.0-60 wt. % of cerium-oxide, ceria alumina comprises 1.0-40 wt. % of cerium-oxide, lanthana-zirconia comprises 70-99 wt. % of zirconia and alumina zirconia comprises 1-40 wt. % of zirconia.

Figure 1B:
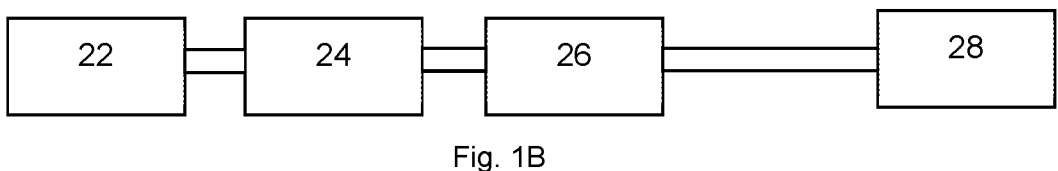

In one embodiment, the catalytic article (b) is an under-floor catalytic article or a second close coupled catalytic article. In one illustrative embodiment, the automotive catalyst system of the presently claimed invention is shown in FIG. 1B which comprises an engine (22), a close-coupled catalytic article (CC1, 24), an underfloor catalytic article (26) and a tail-pipe catalytic article (28) which is arranged downstream and away from the underfloor catalytic article (26). The reference catalyst system is illustrated in FIG. 1A which comprises an engine (22), a close-coupled catalytic article (CC1, 24), and an underfloor catalytic article (26).

In one embodiment, the first close coupled three-way conversion catalytic article (a) and/or the catalytic article (b) is a single layered or bi-layered catalytic article. In one embodiment, the first close coupled three-way conversion catalytic article (a) and/or the catalytic article (b) is a single-layered catalytic article comprising a front zone and a rear zone.

In one embodiment, the first close coupled three-way conversion catalytic article (a) and/or the catalytic article (b) is a bi-layered catalytic article comprising a bottom layer and a top layer, wherein said bottom and/or top layer comprises a front zone and a rear zone.

In one embodiment, the tail-pipe catalytic article comprises a non-platinum group metal selected from nickel, copper, iron, manganese, zinc, titanium, vanadium, chromium or combination thereof, supported on a support, said support is selected from ceria component, zirconia component and oxygen storage component. The loading or amount of non-platinum group metal is in the range of 0.1 to 20 wt. % or 10 to 500 g/ft³. The non-platinum group metal can be used alone in the tail-pipe catalyst as a replacement of PGM or it can be used in combination with PGM. As an example, placing the non-platinum group metal or metals, such as nickel and/or copper, away from an engine allows mitigation of exposure to severe aging conditions thereby reducing the deactivation of the catalyst. In one embodiment, a combination nickel (Ni) and copper (Cu) is used. In one embodiment, the amount of nickel used is 5.0 to 15 wt. % and the amount of copper used is 0.2 to 1.0 wt. %. In one preferred embodiment, the amount of nickel used is 10 wt. % and the amount of copper used is 0.5 wt. %. Further, the use of a support such as ceria component, zirconia component and oxygen storage component in addition to or in lieu of an alumina component can limit or prevent completely the formation of less active non-platinum group metal mixed oxides, such as nickel-aluminate and copper-aluminate. Still further, possible poising of PGM can be avoided by separately placing non-platinum group metal.

As used herein, the term "substrate" refers to the monolithic material onto which the catalyst composition is placed, typically in the form of a washcoat containing a plurality of particles containing a catalytic composition thereon.

Reference to "monolithic substrate" or "honeycomb substrate" means a unitary structure that is homogeneous and continuous from inlet to outlet.

As used herein, the term "washcoat" has its usual meaning in the art of a thin, adherent coating of a catalytic or other material applied to a substrate material, such as a honeycomb-type carrier member, which is sufficiently porous to permit the passage of the gas stream being treated. A washcoat is formed by preparing a slurry containing a certain solid content (e.g., 15-60% by weight) of particles in a liquid vehicle, which is then coated onto a substrate and dried to provide a washcoat layer.

As used herein and as described in Heck, Ronald and Farrauto, Robert, Catalytic Air Pollution Control, New York: Wiley-Interscience, 2002, pp. 18-19, a washcoat layer includes a compositionally distinct layer of material disposed on the surface of a monolithic substrate or an underlying washcoat layer. In one embodiment, a substrate contains one or more washcoat layers, and each washcoat layer is different in some way (e.g., may differ in physical properties thereof such as, for example particle size or crystallite phase) and/or may differ in the chemical catalytic functions.

The catalytic article may be "fresh" meaning it is new and has not been exposed to any heat or thermal stress for a prolonged period of time. "Fresh" may also mean that the catalyst was recently prepared and has not been exposed to any exhaust gases or elevated temperatures. Likewise, an "aged" catalyst article is not fresh and has been exposed to exhaust gases and elevated temperatures (i.e., greater than 500° C.) for a prolonged period of time (i.e., greater than 3 hours).

According to one or more embodiments, the substrate of the catalytic article of the presently claimed invention may be constructed of any material typically used for preparing automotive catalysts and typically comprises a ceramic or a metal monolithic honeycomb structure. In one embodiment, the substrate is a ceramic substrate, metal substrate, ceramic foam substrate, polymer foam substrate or a woven fiber substrate. In one embodiment, the density of the substrate is <400 cpsi.

The substrate typically provides a plurality of wall surfaces upon which washcoats comprising the catalyst compositions described herein above are applied and adhered, thereby acting as a carrier for the catalyst compositions.

Exemplary metallic substrates include heat resistant metals and metal alloys such as titanium and stainless steel as well as other alloys in which iron is a substantial or major component. Such alloys may contain one or more nickel, chromium, and/or aluminium, and the total amount of these metals may advantageously comprise at least 15 wt. % of the alloy. e.g. 10-25 wt. % of chromium, 3-8% of aluminium, and up to 20 wt. % of nickel. The alloys may also contain small or trace amounts of one or more metals such as manganese, copper, vanadium, titanium and the like. The surface of the metal substrate may be oxidized at high temperature, e.g., 1000° C. and higher, to form an oxide layer on the surface of the substrate, improving the corrosion resistance of the alloy and facilitating adhesion of the washcoat layer to the metal surface.

Ceramic materials used to construct the substrate may include any suitable refractory material, e.g., cordierite, mullite, cordierite-alumina, silicon nitride, zircon mullite, spodumene, alumina-silica magnesia, zircon silicate, sillimanite, magnesium silicates, zircon, petalite, alumina, aluminosilicates and the like.

Any suitable substrate may be employed, such as a monolithic flow-through substrate having a plurality of fine, parallel gas flow passages extending from an inlet to an outlet face of the substrate such that passages are open to fluid flow. The passages, which are essentially straight paths from the inlet to the outlet, are defined by walls on which the catalytic material is coated as a washcoat so that the gases flowing through the passages contact the catalytic material. The flow passages of the monolithic substrate are thin-walled channels which are of any suitable cross-sectional shape, such as trapezoidal, rectangular, square, sinusoidal, hexagonal, oval, circular, and the like. Such structures contain from about 60 to about 1200 or more gas inlet openings (i.e., "cells") per square inch of cross section (cpsi), more usually from about 300 to 900 cpsi. The wall thickness of flow-through substrates can vary, with a typical range being between 0.002 and 0.1 inches. A representative commercially available flow-through substrate is a cordierite substrate having 400 cpsi and a wall thickness of 6 mil, or 600 cpsi and a wall thickness of 4 mil. However, it will be understood that the invention is not limited to a particular substrate type, material, or geometry. In alternative embodiments, the substrate may be a wall-flow substrate, wherein each passage is blocked at one end of the substrate body with a non-porous plug, with alternate passages blocked at opposite end-faces. This requires that gas flow through the porous walls of the wall-flow substrate to reach the exit. Such monolithic substrates may contain up to about 700 or more cpsi, such as about 100 to 400 cpsi and more typically about 200 to about 300 cpsi. The cross-sectional shape of the cells can vary as described above. Wall-flow substrates typically have a wall thickness between 0.002 and 0.1 inches. A representative commercially available wall-flow substrate is constructed from a porous cordierite, an example of which has 200 cpsi and 10 mil wall thickness or 300 cpsi with 8 mil wall thickness, and wall porosity between 45-65%. Other ceramic materials such as aluminum-titanate, silicon carbide and silicon nitride are also used as wall-flow filter substrates. However, it will be understood that the invention is not limited to a particular substrate type, material, or geometry. Note that where the substrate is a wall-flow substrate, the catalyst composition can permeate into the pore structure of the porous walls (i.e., partially or fully occluding the pore openings) in addition to being disposed on the surface of the walls. In one embodiment, the substrate has a flow through ceramic honeycomb structure, a wall-flow ceramic honeycomb structure, or a metal honeycomb structure.

As used herein, the term "stream" broadly refers to any combination of flowing gas that may contain solid or liquid particulate matter.

As used herein, the terms "upstream" and "downstream" refer to relative directions according to the flow of an engine exhaust gas stream from an engine towards a tailpipe, with the engine in an upstream location and the tailpipe and any pollution abatement articles such as filters and catalysts being downstream from the engine.

Figure 8A:
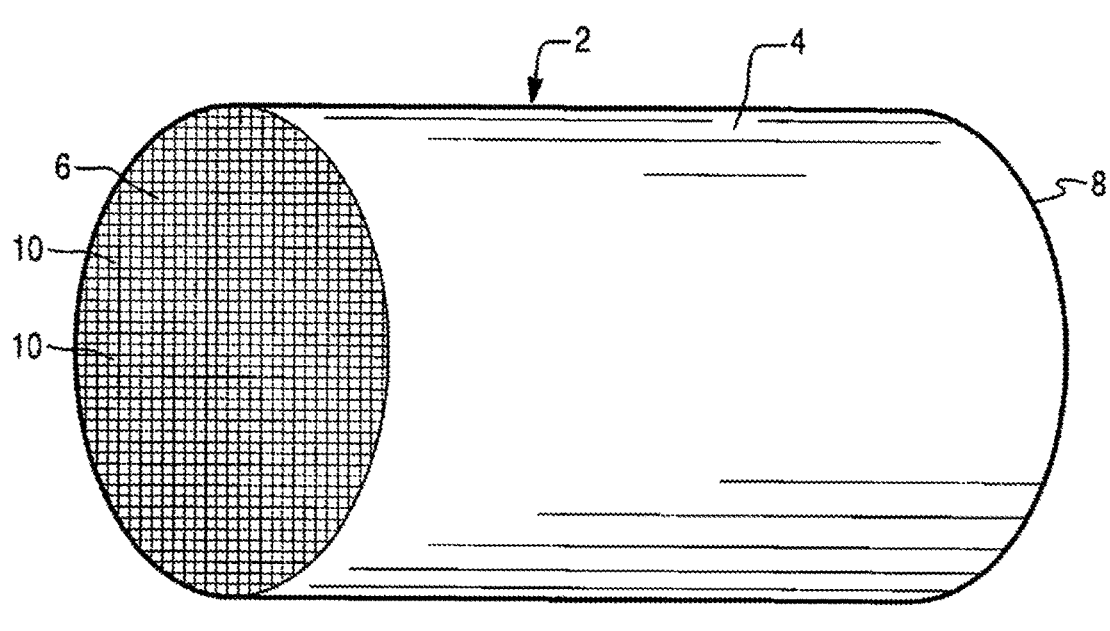
FIG. 8A is a perspective view of a honeycomb-type substrate carrier which may comprise the catalyst composition in accordance with one embodiment of the presently claimed invention.
Figures 8B, 9:
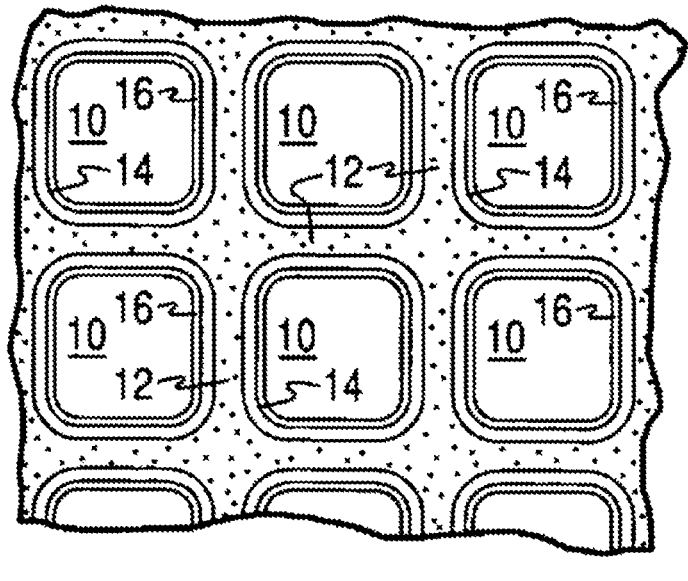
FIG. 8B is a partial cross-section view enlarged relative to FIG. 8A and taken along a plane parallel to the end faces of the substrate carrier of FIG. 8A, which shows an enlarged view of a plurality of the gas flow passages shown in FIG. 8A.
FIG. 9 is a cutaway view of a section enlarged relative to FIG. 8A, wherein the honeycomb-type substrate in FIG. 8A represents a wall flow filter substrate monolith.

FIGS. 8A and 8B illustrate an exemplary substrate 2 in the form of a flow-through substrate coated with washcoat compositions as described herein. Referring to FIG. 8A, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 8B, flow passages 10 are formed by walls 12 and extend through substrate 2 from upstream end face 6 to downstream end face 8, the passages 10 being unobstructed so as to permit the flow of a fluid, e.g., a gas stream, longitudinally through substrate 2 via gas flow passages 10 thereof. As more easily seen in FIG. 8B, walls 12 are so dimensioned and configured that gas flow passages 10 have a substantially regular polygonal shape. As shown, the washcoat compositions can be applied in multiple, distinct layers if desired. In the illustrated embodiment, the washcoats consist of a discrete first washcoat layer 14 adhered to the walls 12 of the substrate member and a second discrete washcoat layer 16 coated over the first washcoat layer 14. In one embodiment, the presently claimed invention is also practiced with two or more (e.g., 3, or 4) washcoat layers and is not limited to the illustrated two-layer embodiment.

FIG. 9 illustrates an exemplary substrate 2 in the form of a wall flow filter substrate coated with a washcoat composition as described herein. As seen in FIG. 9, the exemplary substrate 2 has a plurality of passages 52. The passages are tubularly enclosed by the internal walls 53 of the filter substrate. The substrate has an inlet end 54 and an outlet end 56. Alternate passages are plugged at the inlet end with inlet plugs 58 and at the outlet end with outlet plugs 60 to form opposing checkerboard patterns at the inlet 54 and outlet 56. A gas stream 62 enters through the unplugged channel inlet 64, is stopped by outlet plug 60 and diffuses through channel walls 53 (which are porous) to the outlet side 66. The gas cannot pass back to the inlet side of walls because of inlet plugs 58. The porous wall flow filter used in this invention is catalysed in that the wall of said element has thereon or contained therein one or more catalytic materials. Catalytic materials may be present on the inlet side of the element wall alone, the outlet side alone, both the inlet and outlet sides, or the wall itself may consist all, or in part, of the catalytic material. This invention includes the use of one or more layers of catalytic material on the inlet and/or outlet walls of the element.

In one exemplary embodiment, the automotive catalyst system comprises:

a) a first close coupled three-way conversion catalytic article in fluid communication with an engine exhaust outlet, said article comprises i) a bottom layer comprising 50 to 100 g/ft$^3$ of palladium supported on an alumina component and oxygen storage component, ii) a top layer comprising 1.0 to 50 g/ft$^3$ of rhodium supported on alumina component, and iii) a first substrate;

b) an underfloor catalytic article located downstream of and in fluid communication with the first close coupled three-way conversion catalytic article, said article comprising i) 1.0 g/ft$^3$ to 5.0 g/ft$^3$ of rhodium supported on an alumina component and oxygen storage component, and ii) a second substrate;

c) a tail-pipe catalytic article comprising i) 1.0 to 5.0 g/ft$^3$ of platinum supported on ceria-alumina; and ii) a third substrate, wherein the tail-pipe catalytic article (c) is arranged downstream in fluid communication and 1.0 to 10 feet away from the catalytic article (b) at a position selected from before or behind a resonator; before or after a muffler; between the resonator and the muffler; inside the muffler; inside the resonator; and at a tail pipe end.

In another exemplary embodiment, the automotive catalyst system comprises:

a) a first close coupled three-way conversion catalytic article in fluid communication with an engine exhaust outlet, said article comprises i) a bottom layer comprising 50 to 100 g/ft$^3$ of palladium supported on an alumina component and oxygen storage component, ii) a top layer comprising 1.0 to 50 g/ft$^3$ of rhodium supported on alumina component, and iii) a first substrate;

b) an underfloor catalytic article located downstream of and in fluid communication with the first close coupled three-way conversion catalytic article, said article comprising i) 1.0 g/ft$^3$ to 5.0 g/ft$^3$ of rhodium supported on an alumina component and oxygen storage component, and ii) a second substrate;

c) a tail-pipe catalytic article comprising i) 1.0 to 5.0 g/ft$^3$ of palladium supported on ceria-alumina; and ii) a third substrate, wherein the tail-pipe catalytic article (c) is arranged downstream in fluid communication and 1.0 to 10 feet away from the catalytic article (b) at a position selected from before or behind a resonator; before or after a muffler; between the resonator and the muffler; inside the muffler; inside the resonator; and at a tail pipe end.

In another exemplary embodiment, the automotive catalyst system comprises:

a) a first close coupled three-way conversion catalytic article in fluid communication with an engine exhaust outlet, said article comprises i) a bottom layer comprising 50 to 100 g/ft$^3$ of palladium supported on an alumina component and oxygen storage component, ii) a top layer comprising 1.0 to 50 g/ft$^3$ of rhodium supported on alumina component and a first substrate;

b) an underfloor catalytic article located downstream of and in fluid communication with the first close coupled three-way conversion catalytic article, said article comprising i) 1.0 g/ft$^3$ to 5.0 g/ft$^3$ of rhodium supported on analumina component and oxygen storage component, and ii) a second substrate;

c) a tail-pipe catalytic article comprising i) 1.0 to 5.0 g/ft$^3$ of rhodium supported on ceria-alumina; and ii) a third substrate, wherein the tail-pipe catalytic article (c) is arranged downstream in fluid communication and 1.0 to 10 feet away from the catalytic article (b) at a position selected from before or behind a resonator; before or after a muffler; between the resonator and the muffler; inside the muffler; inside the resonator; and at a tail pipe end.

In another exemplary embodiment, the automotive catalyst system comprises:

a) a first close coupled three-way conversion catalytic article in fluid communication with an engine exhaust outlet, said article comprises i) a bottom layer comprising 50 to 100 g/ft$^3$ of palladium supported on an alumina component and oxygen storage component, ii) a top layer comprising 1.0 to 50 g/ft$^3$ of rhodium supported on alumina component, and iii) a first substrate;

b) an underfloor catalytic article located downstream of and in fluid communication with the first close coupled three-way conversion catalytic article, said article comprising i) 1.0 g/ft$^3$ to 5.0 g/ft$^3$ of rhodium supported on analumina component and oxygen storage component, and ii) a second substrate;

c) a tail-pipe catalytic article comprising i) 0.5 wt. % of CuO and 10 wt. % of NiO supported on ceria and lanthana-zirconia, and ii) a third substrate, wherein the tail-pipe catalytic article (c) is arranged downstream in fluid communication and 1.0 to 10 feet away from the catalytic article (b) at a position selected from before or behind a resonator; before or after a muffler; between the resonator and the muffler; inside the muffler; inside the resonator; and at a tail pipe end.

In one exemplary embodiment, the automotive catalyst system comprises:

a) a first close coupled three-way conversion catalytic article in fluid communication with an engine exhaust outlet, said article comprises i) a bottom layer comprising 90 to 100 g/ft$^3$ of palladium supported on an alumina component and oxygen storage component, ii) a top layer comprising 1-10 g/ft$^3$ of rhodium supported on alumina component, and iii) a first substrate;

b) an underfloor catalytic article located downstream of and in fluid communication with the first close coupled three-way conversion catalytic article, said article comprising i) 1.0 g/ft$^3$ to 5.0 g/ft$^3$ of rhodium supported on an alumina component and oxygen storage component, and ii) a second substrate;

c) a tail-pipe catalytic article comprising i) 1.0 to 5.0 g/ft$^3$ of platinum supported on ceria-alumina, and ii) a third substrate, wherein the tail-pipe catalytic article (c) is arranged downstream in fluid communication and 1.0 to 10 feet away from the catalytic article (b) at a position selected from before or behind a resonator; before or after a muffler; between the resonator and the muffler; inside the muffler; inside the resonator; and at a tail pipe end.

In one exemplary embodiment, the automotive catalyst system comprises:

a) a first close coupled three-way conversion catalytic article in fluid communication with an engine exhaust outlet, said article comprises i) a bottom layer comprising 90 to 100 g/ft$^3$ of palladium supported on an alumina component and oxygen storage component, ii) a top layer comprising 1.0 to 10 g/ft$^3$ of rhodium supported on alumina component, and iii) a first substrate;

b) an underfloor catalytic article located downstream of and in fluid communication with the first close coupled three-way conversion catalytic article, said article comprising i) 1.0 g/ft$^3$ to 5.0 g/ft$^3$ of rhodium supported on an alumina component and oxygen storage component, and ii) a second substrate;

c) a tail-pipe catalytic article comprising i) 1.0 to 5.0 g/ft$^3$ of palladium supported on ceria-alumina; and ii) a third substrate, wherein the tail-pipe catalytic article (c) is arranged downstream in fluid communication and 1.0 to 10 feet away from the catalytic article (b) at a position selected from before or behind a resonator; before or after a muffler; between the resonator and the muffler; inside the muffler; inside the resonator; and at a tail pipe end.

In another exemplary embodiment, the automotive catalyst system comprises:

a) a first close coupled three-way conversion catalytic article in fluid communication with an engine exhaust outlet, said article comprises i) a bottom layer comprising 90 to 100 g/ft$^3$ of palladium supported on an alumina component and oxygen storage component, ii) a top layer comprising 1.0 to 10 g/ft$^3$ of rhodium supported on alumina component, and iii) a first substrate;

b) an underfloor catalytic article located downstream of and in fluid communication with the first close coupled three-way conversion catalytic article, said article comprising i) 1.0 g/ft$^3$ to 5.0 g/ft$^3$ of rhodium supported on an alumina component and oxygen storage component, and ii) a second substrate;

c) a tail-pipe catalytic article comprising i) 0.5 wt. % of CuO and 10 wt. % of NiO supported on ceria and lanthana-zirconia; and ii) a third substrate, wherein the tail-pipe catalytic article (c) is arranged downstream in fluid communication and 1.0 to 10 feet away from the catalytic article (b) at a position selected from before or behind a resonator; before or after a muffler; between the resonator and the muffler; inside the muffler; inside the resonator; and at a tail pipe end.

There is also provided a process for preparing a first close coupled three-way conversion catalytic article. In one embodiment, the process comprises preparing a first layer slurry; depositing the first layer slurry on a substrate to obtain a first layer; preparing a second layer slurry; and depositing the second layer slurry on the first layer to obtain a second layer followed by calcination at a temperature ranging from 400 to 700° C., wherein the step of preparing the first layer slurry or second layer slurry comprises a technique selected from incipient wetness impregnation, incipient wetness co-impregnation, and post-addition. In one embodiment, the process involves a pre-step of thermal or chemical fixing of platinum or palladium or both on supports.

The thermal fixing involves deposition of the PGM onto a support, e.g. via incipient wetness impregnation method, followed by the thermal calcination of the resulting PGM/ support mixture. As an example, the mixture is calcined for 1.0-3.0 hours at 400-700° C. with a ramp rate of 1.0-25° C./min.

The chemical fixing involves deposition of the PGM onto a support followed by a fixation using an additional reagent to chemically transform the PGM. As an example, aqueous Pd-nitrate is impregnated onto alumina. The impregnated powder is not dried or calcined, instead, it is added to an aqueous solution of Ba-hydroxide. As a result of the addition, the acidic Pd-nitrate reacts with the basic Ba-hydroxide yielding the water-insoluble Pd-hydroxide and Ba-nitrate. Thus, Pd is chemically fixed as an insoluble component in the pores and on the surface of the alumina support. Alternatively, the support can be impregnated with the acidic component first followed by the second, basic, component. The chemical reaction between the two reagents deposited onto the support, e.g. alumina, lead to the formation of insoluble or little soluble compounds that are also deposited in the support pores and on the surface.

Incipient wetness impregnation techniques, also called capillary impregnation or dry impregnation are commonly used for the synthesis of heterogeneous materials, i.e., catalysts. Typically, an active metal precursor is dissolved in an aqueous or organic solution and then the metal-containing solution is added to a catalyst support containing the same pore volume as the volume of the solution that was added. Capillary action draws the solution into the pores of the support. Solution added in excess of the support pore volume causes the solution transport to change from a capillary action process to a diffusion process, which is much slower. The catalyst is dried and calcined to remove the volatile components within the solution, depositing the metal on the surface of the catalyst support. The concentration profile of the impregnated material depends on the mass transfer conditions within the pores during impregnation and drying. Multiple active metal precursors, after appropriate dilution, can be co-impregnated onto a catalyst support. Alternatively, an active metal precursor is introduced to a slurry via post-addition under agitation during the process of a slurry preparation.

The support particles are typically dry enough to absorb substantially all of the solution to form a moist solid. Aqueous solutions of water-soluble compounds or complexes of the active metal are typically utilized, such as rhodium chloride, rhodium nitrate, rhodium acetate, or combinations thereof where rhodium is the active metal and palladium nitrate, palladium tetra amine, palladium acetate, or combinations thereof where palladium is the active metal. Following treatment of the support particles with the active metal solution, the particles are dried, such as by heat treating the particles at elevated temperature (e.g., 100-150° C.) for a period of time (e.g., 1.0-3.0 hours), and then calcined to convert the active metal to a more catalytically active form. An exemplary calcination process involves heat treatment in air at a temperature of about 400- 550° C. for 10 minutes to 3.0 hours. The above process can be repeated as needed to reach the desired level of loading of the active metal by means of impregnation.

The above-noted catalyst compositions are typically prepared in the form of catalyst particles as noted above. These catalyst particles are mixed with water to form a slurry for purposes of coating a catalyst substrate, such as a honeycomb-type substrate. In addition to the catalyst particles, the slurry may optionally contain a binder in the form of alumina, silica, zirconium acetate, zirconia, or zirconium hydroxide, associative thickeners, and/or surfactants (including anionic, cationic, non-ionic or amphoteric surfactants). Other exemplary binders include boehmite, gamma-alumina, or delta/theta alumina, as well as silica sol. When present, the binder is typically used in an amount of about 1.0-5.0 wt. % of the total washcoat loading. Addition of acidic or basic species to the slurry is carried out to adjust the pH accordingly. For example, in some embodiments, the pH of the slurry is adjusted by the addition of ammonium hydroxide, aqueous nitric acid, or acetic acid. A typical pH range for the slurry is about 3 to 12.

The slurry can be milled to reduce the particle size and enhance particle mixing. The milling is accomplished in a ball mill, continuous mill, or other similar equipment, and the solids content of the slurry may be, e.g., about 20-60 wt. %, more particularly about 20-40 wt. %. In one embodiment, the post-milling slurry is characterized by a $D_{90}$ particle size of about 3 to about 40 microns, preferably 10 to about 30 microns, more preferably about 10 to about 15 microns. The $D_{90}$ is determined using a dedicated particle size analyzer. The equipment employed in this example uses laser diffraction to measure particle sizes in small volume slurry. The $D_{90}$, typically with units of microns, means 90% of the particles by number have a diameter less than that value.

The slurry is coated on the catalyst substrate using any washcoat technique known in the art. In one embodiment, the catalyst substrate is dipped one or more times in the slurry or otherwise coated with the slurry. Thereafter, the coated substrate is dried at an elevated temperature (e.g., 100-150° C.) for a period (e.g., 10 min-3.0 hours) and then calcined by heating, e.g., at 400-700° C., typically for about 10 minutes to about 3 hours. Following drying and calcining, the final washcoat coating layer is viewed as essentially solvent-free. After calcining, the catalyst loading obtained by the above described washcoat technique can be determined through calculation of the difference in coated and uncoated weights of the substrate. As will be apparent to those of skill in the art, the catalyst loading can be modified by altering the slurry rheology. In addition, the coating/drying/calcining process to generate a washcoat can be repeated as needed to build the coating to the desired loading level or thickness, meaning more than one washcoat may be applied.

In certain embodiments, the coated substrate is aged, by subjecting the coated substrate to heat treatment. In one embodiment, aging is done at a temperature of about 850° C. to about 1050° C. in an environment of 10 vol. % water in an alternating hydrocarbon/air feed for 50-75 hours. Aged catalyst articles are thus provided in certain embodiments. In certain embodiments, particularly effective materials comprise metal oxide-based supports (including, but not limited to substantially 100% ceria supports) that maintain a high percentage (e.g., about 95-100%) of their pore volumes upon aging (e.g., at about 850° C. to about 1050° C., 10 vol. % water in an alternating hydrocarbon/air feed, 50-75 hours aging).

There is also provided a process for preparing an under-floor catalytic article. In one embodiment, the process involves preparing a slurry using a support such as alumina and OSC and adding PGM to the slurry to form a washcoat. In one embodiment, the slurry is milled after all components are added and coated as a layer on a cordierite substrate.

There is also provided a process for preparing a tail-pipe catalytic article. In one embodiment, the process involves preparing a slurry using one or more supports such as alumina and OSC, adding PGM to the slurry to form a washcoat and depositing the washcoat on a substrate.

In one aspect, the presently claimed invention also provides a method of treating a gaseous exhaust stream which comprises hydrocarbons, carbon monoxide, and nitrogen oxide. The method involves contacting the exhaust stream with a catalyst system or an exhaust system according to the presently claimed invention. The terms "exhaust stream", "engine exhaust stream", "exhaust gas stream", and the like refer to any combination of flowing engine effluent gas that may also contain solid or liquid particulate matter. The stream comprises gaseous components and is, for example, exhaust of a lean burn engine, which may contain certain non-gaseous components such as liquid droplets, solid particulates and the like. An exhaust stream of a lean burn engine typically comprises combustion products, products of incomplete combustion, oxides of nitrogen, combustible and/or carbonaceous particulate matter (soot) and un-reacted oxygen and/or nitrogen. Such terms refer as well as to the effluent downstream of one or more other catalyst system components as described herein. In one embodiment, there is provided a method of treating exhaust stream containing carbon monoxide.

In another aspect, the presently claimed invention also provides a method of reducing hydrocarbons, carbon monoxide, and nitrogen oxide levels in a gaseous exhaust stream. The method involves contacting the gaseous exhaust stream with a catalyst system or an exhaust system according to the presently claimed invention to reduce the levels of hydrocarbons, carbon monoxide, and nitrogen oxide in the exhaust gas. In one embodiment, there is provided a method of reducing carbon monoxide level in a gaseous exhaust stream which involves contacting the gaseous exhaust stream with a catalyst system or an exhaust system according to the presently claimed invention.

In still another aspect, the presently claimed invention also provides use of the catalyst system of the presently claimed invention for purifying a gaseous exhaust stream comprising hydrocarbons, carbon monoxide, and nitrogen oxide.

In some embodiments, the catalyst system converts at least about 60%, or at least about 70%, or at least about 75%, or at least about 80%, or at least about 90%, or at least about 95% of the amount of carbon monoxide, hydrocarbons and nitrous oxides present in the exhaust gas stream prior to contact with the catalyst system. In some embodiment, the catalyst system converts hydrocarbons to carbon dioxide and water. In some embodiments, the catalyst system converts at least about 60%, or at least about 70%, or at least about 75%, or at least about 80%, or at least about 90%, or at least about 95% of the amount of hydrocarbons present in the exhaust gas stream prior to contact with the catalyst system. In some embodiment, the catalytic article converts carbon monoxide to carbon dioxide. In some embodiment, the catalyst system converts nitrogen oxides to nitrogen.

In some embodiments, the catalytic article converts at least about 60%, or at least about 70%, or at least about 75%, or at least about 80%, or at least about 90%, or at least about 95% of the amount of nitrogen oxides present in the exhaust gas stream prior to contact with the catalytic article. In some embodiment, the catalytic article converts at least about 50%, or at least about 60%, or at least about 70%, or at least about 80%, or at least about 90%, or at least about 95% of the total amount of hydrocarbons, carbon dioxide, and nitrogen oxides combined present in the exhaust gas stream prior to contact with the catalytic article.

In another aspect, there is provided use of the catalyst system according to presently claimed invention for purifying a gaseous exhaust stream comprising hydrocarbons, carbon monoxide, and nitrogen oxide.

EXAMPLES

Aspects of the presently claimed invention are more fully illustrated by the following examples, which are set forth to illustrate certain aspects of the present invention and are not to be construed as limiting thereof.

Example 1 (Reference Catalyst System: CC1+UF)

A. Preparation of CC1 Catalytic Article:

A Pd/Rh-based CC1 TWC catalytic article was prepared and used as a close-coupled reference catalytic article. The total PGM loading (Pt/Pd/Rh) is 0/96/4. The bottom coat contains 96 g/ft$^3$ Pd, or 100% of total Pd in the catalytic article. The top coat contains 4 g/ft$^3$ of Rh, or 100% of total Rh in the catalytic article. The bottom coat has a washcoat loading of 2.583 g/inch$^3$ and the top coat has a washcoat loading of 1.002 g/inch$^3$.

The bottom coat was prepared by impregnating 50% of Pd-nitrate solution (35.65 grams, 27% aqueous Pd-nitrate solution) on 321 grams of alumina and 50% of Pd-nitrate solution (35.65 grams, 27% aqueous Pd-nitrate solution) on 454 grams of ceria-zirconia.

The alumina portion was fixed chemically by adding the Pd/alumina mixture to an aqueous solution of 173 grams of barium acetate in water. This component was then milled to a D$_{90}$ of below 16 μm. The pH was controlled around 4.0-5.0 by addition of nitric acid, if necessary. The ceria-zirconia portion was added to water and milled to D$_{90}$ of below 16 μm. The pH was controlled around 4-5 by addition of nitric acid, if necessary. The two slurry components were then blended.

The top coat is prepared by impregnating a mixture of 20.7 grams of Rh-nitrate (10% Rh-content) in 720 grams of water on 779 grams of alumina. The resulting powder was then mixed with water and milled to a D$_{90}$ of below 16 μm. The pH was controlled around 4.0-5.0 by addition of nitric acid, if necessary.

The catalytic article was prepared by first coating the bottom coat slurry onto a ceramic substrate. The obtained coated substrate was then dried and calcined for 2 hours at 500° C. Then, the top coat slurry was applied. The resulting product was again calcined for 2 hours at 500° C. The reference catalytic article (RC-CC1) is shown in FIG. 10.

B. Preparation of a Reference UF Catalytic Article

A reference UF catalytic article is a rhodium-based single layer catalyst. The PGM loading was 0/0/3 g/ft$^3$ for Pt/Pd/Rh, respectively. The washcoat loading is 2.8 g/inch$^3$. A slurry was prepared using OSC (40% ceria) and alumina at 1:2 ratio. 25.7 grams of barium acetate, 30 grams of strontium acetate and 8 grams of zirconyl acetate were mixed with water and 1000 grams support. 6.3 grams of rhodium nitrate solution with 9.8% rhodium by weight and 25 grams of barium acetate were added to the slurry to form a washcoat. There was no impregnation or pre-calcination of the PGM. The slurry was milled after all components were added. The milled (D$_{90}$ of below 16 μm) slurry was coated as a layer on a cordierite substrate. The catalytic article (UF) is shown in FIG. 1D.

Example 2 (Invention Catalyst System A: CC1+UF+Pt-Based Tail Pipe Catalytic Article A)

Preparation of Pt-Based Tail-Pipe Catalytic Article

Figures 1, 1E:
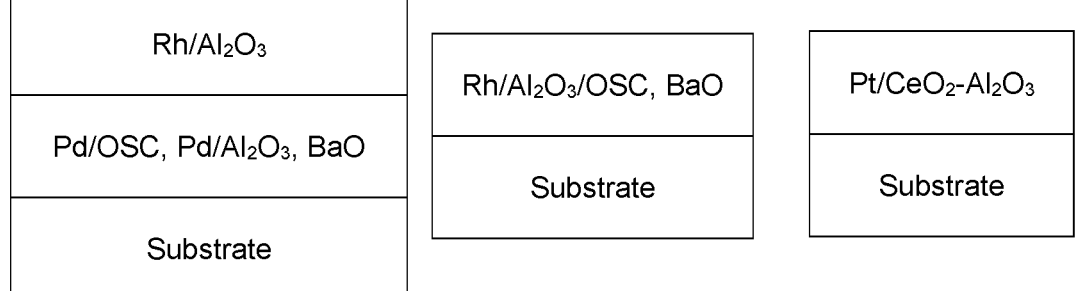

A tail pipe catalytic article A was prepared by mixing 4.25 grams of 14.3% platinum nitrate solution with 606 grams ceria, 71.4 grams alumina, 176.61 grams of 19.8% alumina binder solution and 696 grams water. The resulting mixture's pH was lowered with nitric acid to 4-5, if necessary. Subsequently, the mixture was milled to a D$_{90}$ of below 16 μm. The resulting slurry was washcoated onto a ceramic substrate. This tail pipe catalytic article was used in combination with CC1 and UF prepared as per example 1. The tail pipe catalytic article is shown in FIG. 1E. The PGM loading is 3/0/0 g/ft$^3$ for Pt/Pd/Rh, respectively. The washcoat loading is 2.0 g/inch$^3$

Example 3 (Invention System B: CC1+UF+Pd-Based Tail Pipe Catalytic Article B)

Preparation of Pd-Based Tail-Pipe Catalytic Article

A tail pipe catalytic article B was prepared by mixing 2.16 grams of 28.1% palladium nitrate solution with 339 grams OSC (40% ceria content), 339 grams lanthana stabilized alumina, 176.61 grams of 19.8% alumina binder solution and 696 grams water. The resulting mixture's pH was lowered with nitric acid to 4-5, if necessary. Subsequently, the mixture was milled to a D$_{90}$ of below 16 μm. The resulting slurry was washcoated onto a ceramic substrate. The PGM loading is 0/3/0 g/ft$^3$ for Pt/Pd/Rh, respectively. The washcoat loading is 2.0 g/inch$^3$.

Example 4 (Invention System C: CC1+UF+Pd-Based Tail Pipe Catalytic Article C)

Preparation of Rh Based Tail-Pipe Catalytic Article C

A tail pipe catalytic article C was prepared by mixing 6.12 grams of 9.9% rhodium nitrate solution with 606 grams OSC (10% ceria content), 71 grams lanthana stabilized alumina, 176.61 grams of 19.8% alumina binder solution and 696 grams water. The resulting mixture's pH was lowered with nitric acid to 4-5, if necessary. Subsequently, the mixture was milled to a D$_{90}$ of below 16 μm. The resulting slurry was washcoated onto a ceramic substrate. The PGM loading is 0/0/3 g/ft$^3$ for Pt/Pd/Rh, respectively. The washcoat loading is 2.0 g/inch$^3$.

Example 5 (Invention System D: CC1+UF+Cu/Ni-Based Tail Pipe Catalytic Article D)

Preparation of 0.5% CuO and 10% NiO Based Tail-Pipe Catalyst

A PGM-free tail pipe catalyst was prepared by mixing 761.9 grams ceria, 13.1 grams copper nitrate (34.2% CuO), 127 grams lanthana-zirconia, 127 grams 19.5% alumina binder solution, 395.5 grams of nickel nitrate (25.17% NiO) and 1075 grams water. The resulting mixture's pH was reduced to 4-5 using nitric acid if necessary. The mixture was milled to a $D_{90}$ of below 16 μm and then the resulting slurry is coated onto ceramic substrates. The PGM loading is 0/0/0 g/ft$^3$ for Pt/Pd/Rh, respectively. The washcoat loading is 4.0 g/inch$^3$.

Example 6 (Aging and Testing)

All catalytic articles were coated on 4.16×1.5" 600/3.5 cordierite substrates. The CC1 and UF catalytic articles were aged using a reactor operating such that the sample is exposed to an alternating lean/rich gas feed at an inlet temperature of 950° C. for 12 hours. The tail-pipe catalysts were aged using the same protocol but at an inlet temperature of 600° C. The latter temperature was experimentally determined as a result of the temperature drop within the vehicle exhaust system during and engine bench aging. It was determined, that exposing the CC catalyst (in the existing 2016 SULEV-30 vehicle) to an aging inlet temperature of 950° C. results in a 550-580° C. temperature in the tail-pipe region of the said emissions system. The temperature drop was determined at 50° C. per foot manifold. Therefore, the reactor aging inlet temperature was set to 600° C. (inlet) for the tail pipe catalysts.

Subsequently, the catalytic articles were tested as a system of CC1+UF+Tail pipe catalyst on a reactor operating such that the emissions and temperature traces of a 2016 SULEV-30 vehicle with a four-cylinder gasoline engine can be reproduced. The tail pipe catalyst was removed for the reference measurement. All testing was performed using the FTP-72 testing protocol. Each test was repeated at least 3 times to assure data reproducibility. The same CC1 and UF catalytic articles were used in all cases and only the tail-pipe catalytic article was varied to allow direct comparison of the tail pipe catalytic article impact on the system's performance.

Example 7: Testing Results

Figure 2A:
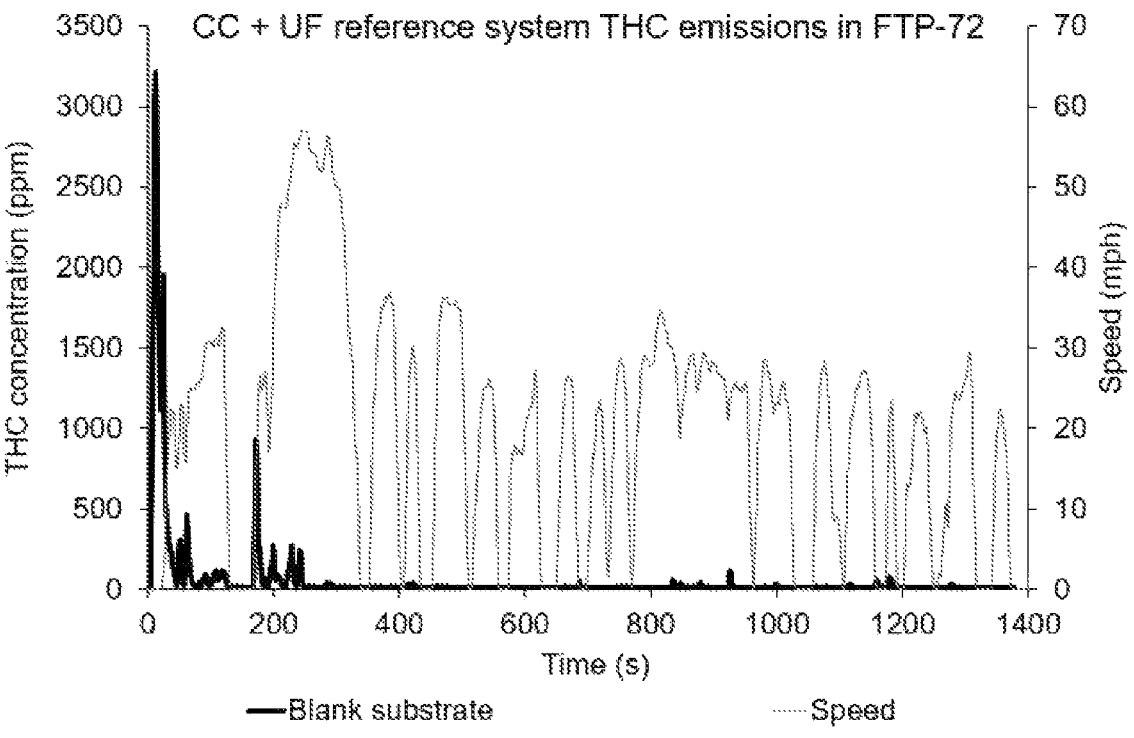
Figure 2B:
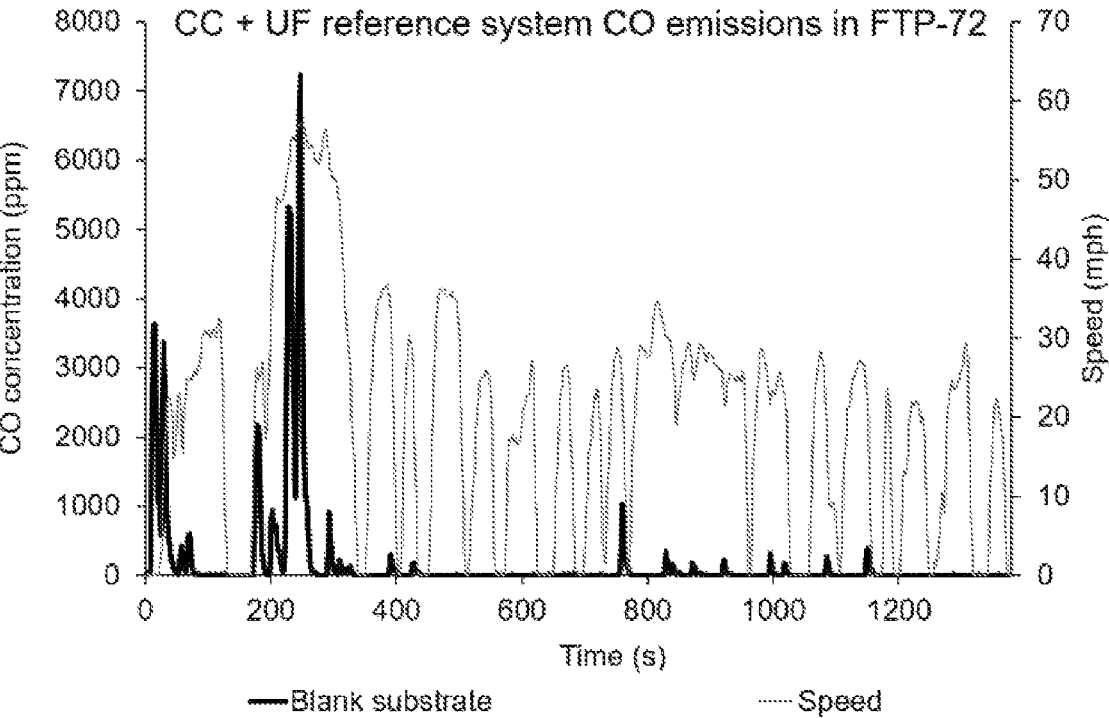
Figure 2C:
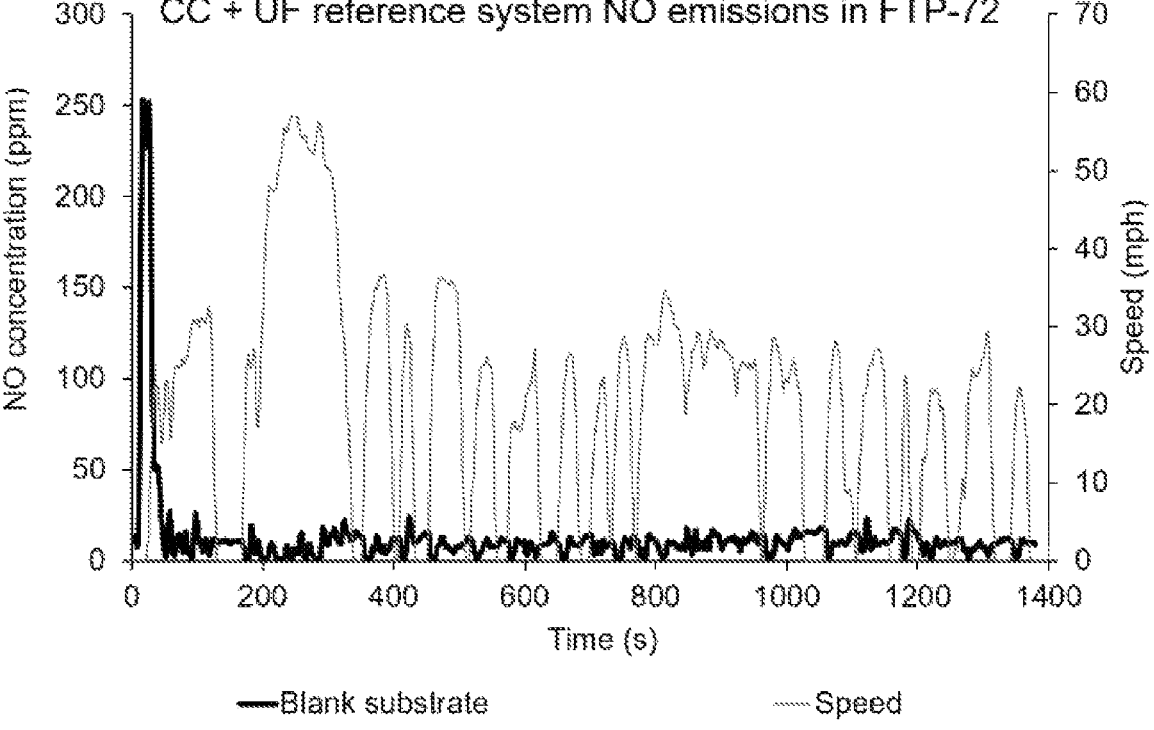

The THC, CO and NO emission evolution in the FTP-72 test for the CC+UF reference system is shown in FIGS. 2A and 2B.

Figure 3:
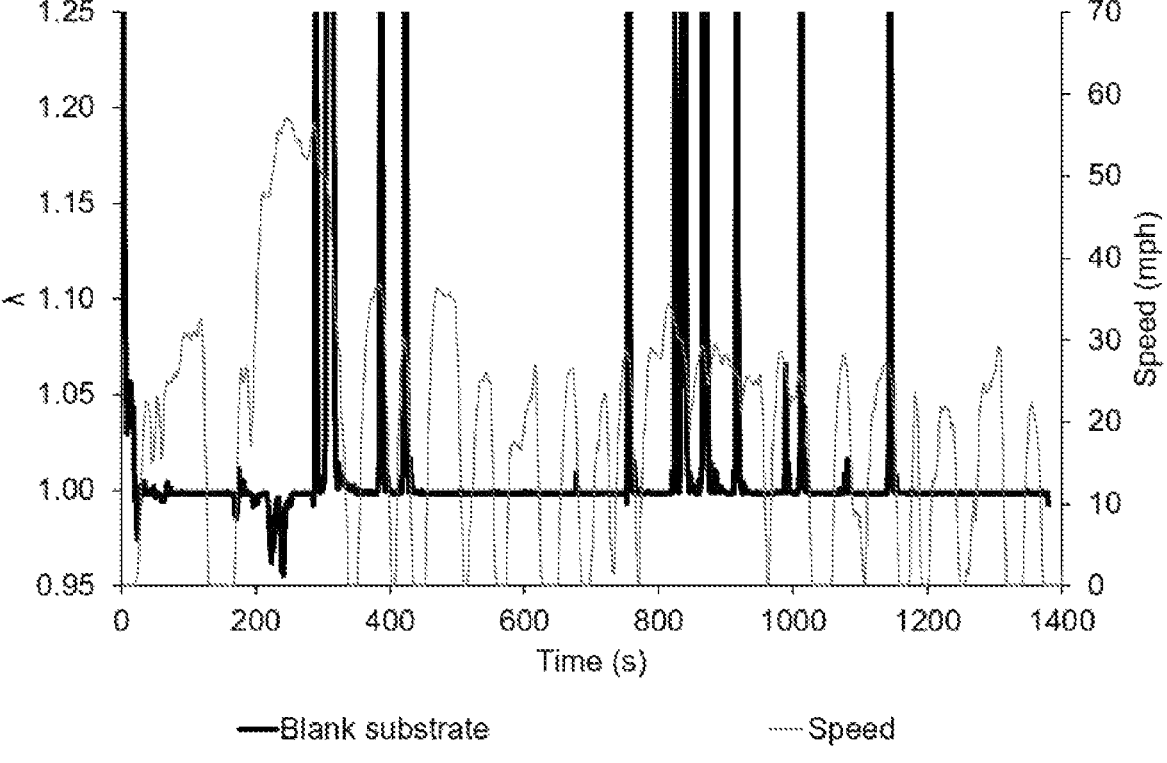
FIG. 3 illustrates the lambda trace in the FTP-72 test as measured after utilizing the reference system.

There are two main types of emissions: 1) cold-start emissions prior to complete catalyst light-off (~0-100 s of the FTP-72 test) and 2) "hot emissions" after cold-start which also include the emissions occurring while the vehicle is accelerating, and the engine is operating rich ($\lambda \leq 1$) (~150-1200 s of the FTP-72 test). Because the CC+UF system is generally very efficient at lambda oscillation mitigation due to significant OSC capacity, the typical tail pipe exhaust gas composition lambda is generally close to 1. However, there are several rich (acceleration) and lean (fuel-cut) events that may affect the effectiveness of the catalyst system performance. These lambda trace as measured after the CC+UF system is reported in FIG. 3.

Figure 4:
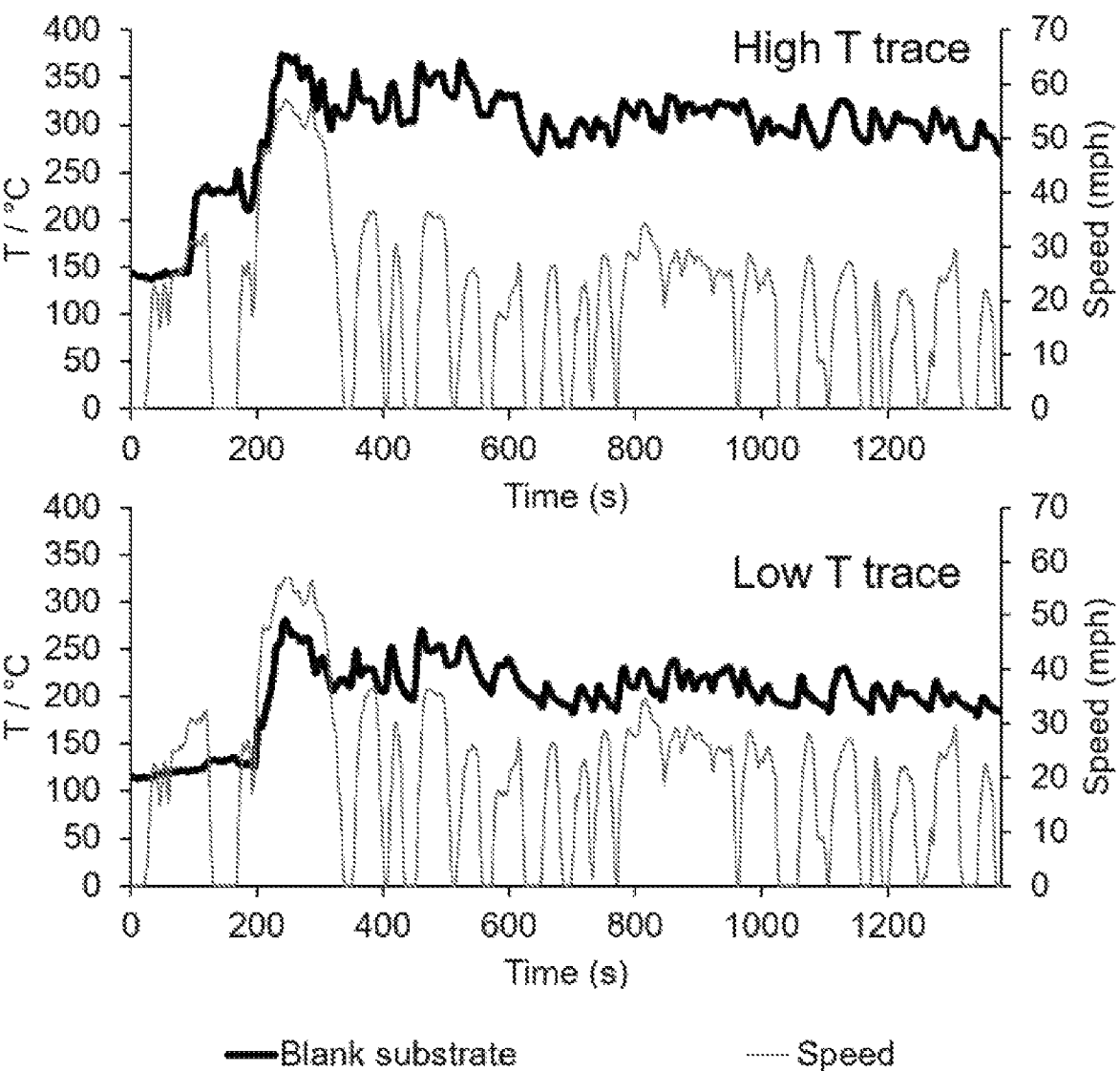
FIG. 4 illustrates the two temperature traces used for the evaluation of performance of the catalyst system according to the presently claimed invention.

The operational temperature of the tail pipe catalyst was varied to demonstrate the importance of the correct catalyst placement in the exhaust system, which is vehicle- and application-specific. For the presented example, the vehicle exhaust temperature trace was varied to explore the range of operation and, subsequently, two representative temperatures were chosen. These are presented in FIG. 4. The trace starting temperature is above room-temperature in order to allow the reactor heat-up to match that of the vehicle exhaust during high-speed acceleration at ~200 s. There is no significant activity contribution to the overall emissions results at the said starting temperatures.

Figure 5:
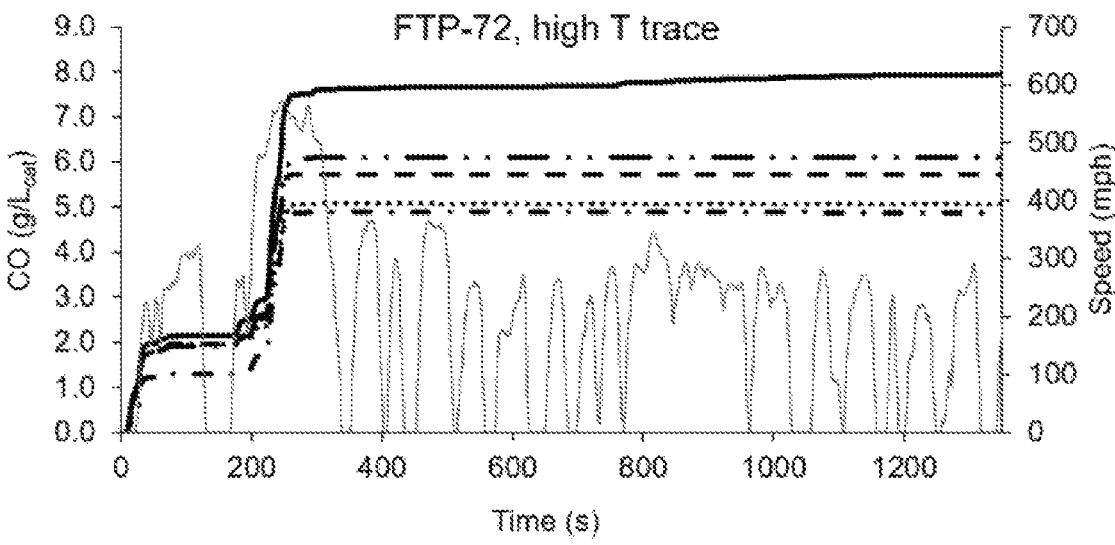
FIG. 5 illustrates comparative CO emission performance of the various catalyst system designs.
Figure 5:
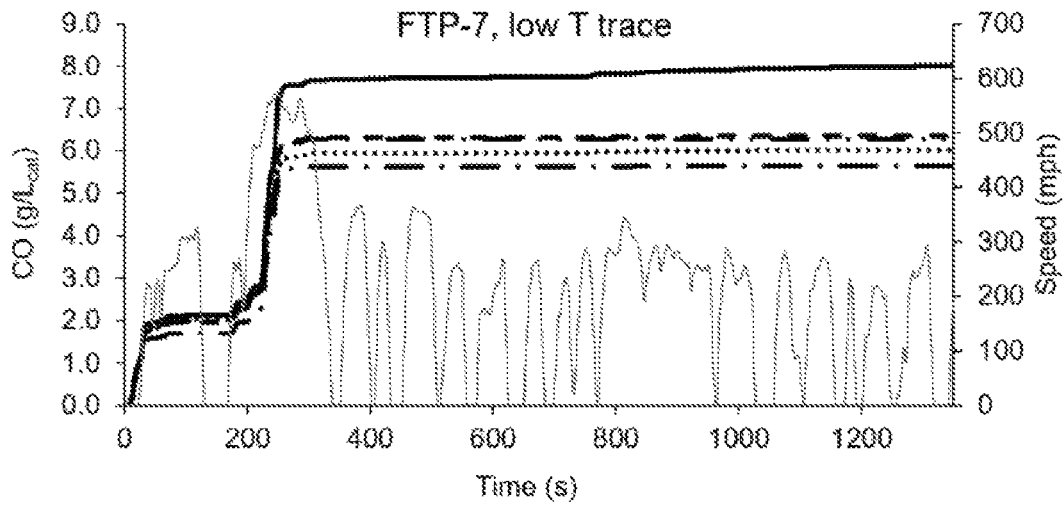
Figure 6:
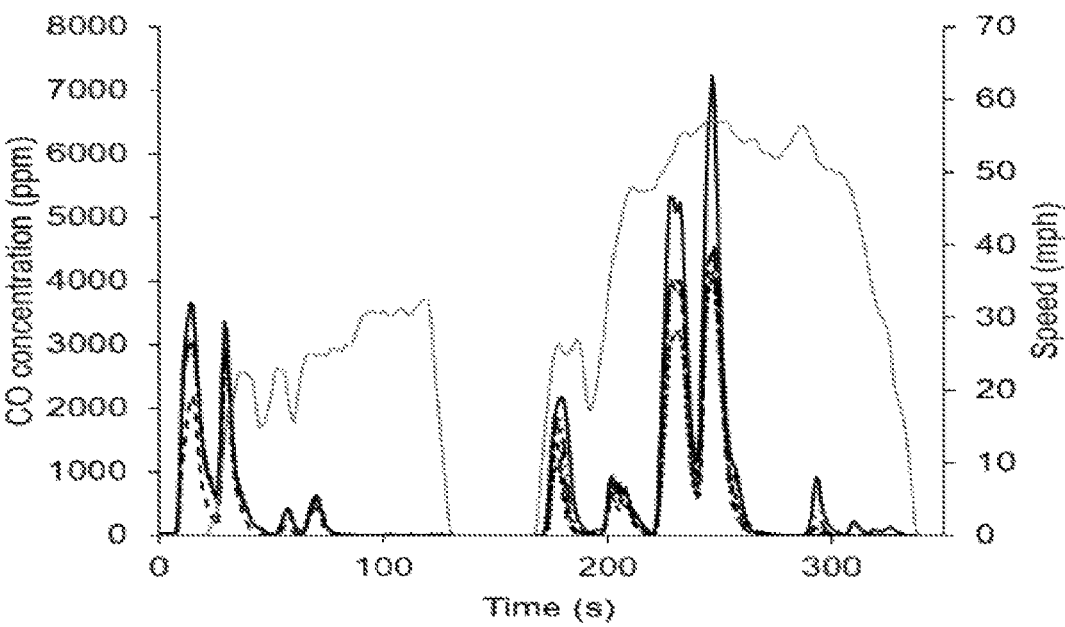
FIG. 6 illustrates comparative CO evolution suppression.
Figure 6:
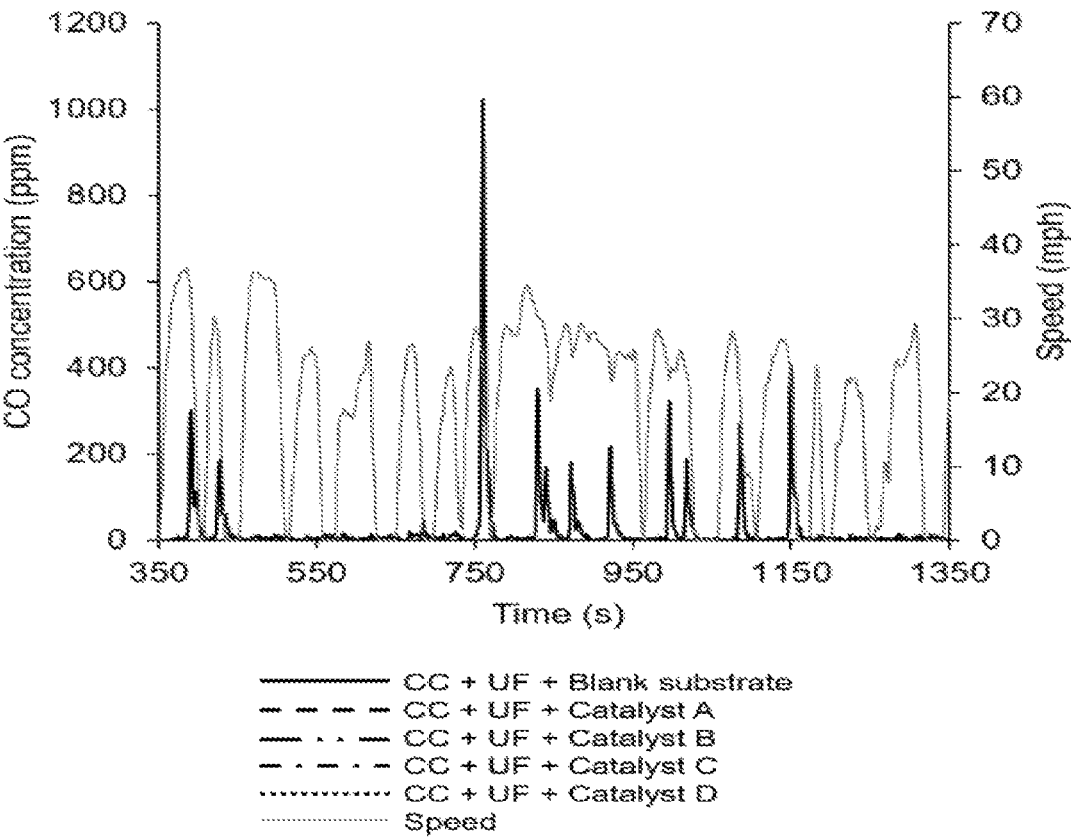

FIG. 5 show the cumulative CO emission plots for the CC+UF system using both the tail pipe catalyst designs as well as the blank substrate used as a reference. The conversion levels for THC, CO and NO observed using the tail pipe catalytic article are summarized in Table 1. FIG. 6 show the areas of CO emissions improvement.

TABLE 1

Conversion levels for THC, CO and NO observed using the high and low T trace for tail pipe catalyst evaluation in the FTP-72 test.

| Sample | Conversion (%) | | | | | |
|---|---|---|---|---|---|---|
| (Catalytic | Low T trace | | | High T trace | | |
| Article) | THC | CO | NO | THC | CO | NO |
| Catalyst A | 5 | 29.5 | 0 | 9.2 | 38.5 | 2 |
| Catalyst B | 4.8 | 21.4 | 0.2 | 3 | 23.1 | 1.8 |
| Catalyst C | 2.4 | 20.5 | 2.3 | 3.1 | 27.9 | 4.7 |
| Catalyst D | 5.2 | 24.6 | 0 | 3.3 | 36.1 | 1 |

The proposed tail pipe catalytic article designs achieve conversions as high as 40% under the chosen experimental conditions, thus demonstrating the effectiveness of the proposed approach to mitigate break-through emissions. The key aspect of the presented invention system is that it can effectively handle the CO emissions occurring during rich engine operation, for example when the vehicle rapidly accelerates.

Under the high temperature emissions trace conditions, the Pt-based formulation (tail pipe catalytic article) is especially efficient as it allows up to ~39% CO and ~9% THC emissions reduction. The Cu/Ni base metal oxide (BMO) formulation (tail pipe catalytic article) is also efficient, achieving as high as 36% CO and 3% THC conversion. The Pd and Rh-based catalytic articles achieve ~23% and ~28% CO conversion, respectively, with ~3% THC conversion in each case. The NO values are best with Rh. However, generally the NO emissions are very low (150s) in the FTP-72 test for the chosen system, see FIG. 6. The conversion levels can be further significantly increased by adjusting the placement of the catalytic article in the system as the activity is affected by the exhaust temperature. Thus, the optimal position can be evaluated. The optimal position is a position offering a balance between moderate aging temperature and highest corresponding, position-dependent, exhaust temperature during normal operation.

Figure 7:
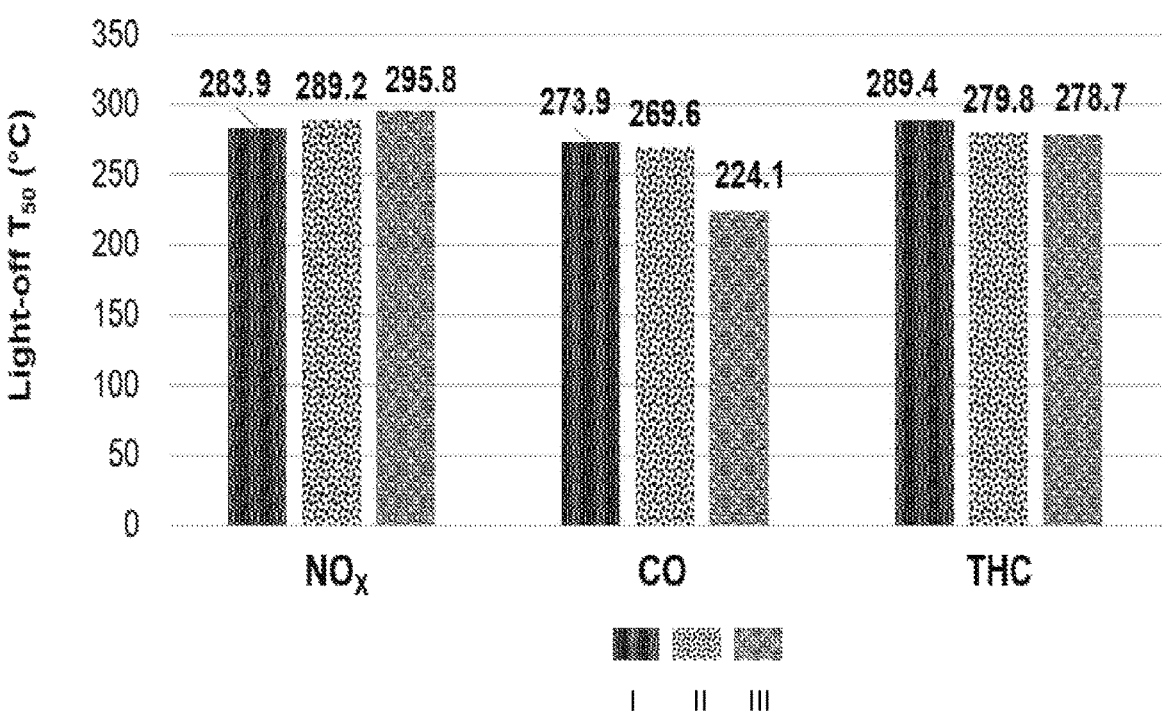
FIG. 7 illustrates light-off performance of the various catalyst systems.

The overall trends are also very similar for the lower temperature trace. Pt-based tail pipe catalytic article shows comparatively higher performance. As shown in FIG. 7, the Pt-catalytic article (Pt/Pd/Rh:3/0/0, III) also exhibits the best light-off performance compared to Rh-catalytic article (Pt/Pd/Rh:0/0/3, I) and Pd-catalytic article (Pt/Pd/Rh: 0/3/0, II) and, therefore, highest emissions reduction in the cold-start portion of the emissions trace. This is especially pronounced in the case of the CO emissions where the Pt-based tail pipe catalytic article design achieves ~50° C. lower light-off $T_{50}$ values than the Pd- and Rh-based tail pipe catalytic article designs.

Reference throughout this specification to "one embodiment," "certain embodiments," "one or more embodiments" or "an embodiment" means that a particular feature, structure, material, or characteristic described in connection with the embodiment is included in at least one embodiment of the presently claimed invention. Thus, the appearances of the phrases such as "in one or more embodiments," "in certain embodiments," "in some embodiments," "in one embodiment," or "in an embodiment" in various places throughout this specification are not necessarily referring to the same embodiment of the presently claimed invention. Furthermore, the particular features, structures, materials, or characteristics may be combined in any suitable manner in one or more embodiments. All of the various embodiments, aspects, and options disclosed herein can be combined in all variations, regardless of whether such features or elements are expressly combined in a specific embodiment description herein. This presently claimed invention is intended to be read holistically such that any separable features or elements of the disclosed invention, in any of its various aspects and embodiments, should be viewed as intended to be combinable unless the context clearly dictates otherwise.

Although the embodiments disclosed herein have been described with reference to particular embodiments it is to be understood that these embodiments are merely illustrative of the principles and applications of the presently claimed invention. It will be apparent to those skilled in the art that various modifications and variations can be made to the methods and apparatus of the presently claimed invention without departing from the spirit and scope of the presently claimed invention. Thus, it is intended that the presently claimed invention include modifications and variations that are within the scope of the appended claims and their equivalents, and the above-described embodiments are presented for purposes of illustration and not of limitation. All patents and publications cited herein are incorporated by reference herein for the specific teachings thereof as noted, unless other statements of incorporation are specifically provided.

What is claimed is:

1. An automotive catalyst system comprising:
   a) a first close coupled three-way conversion catalytic article in fluid communication with an engine exhaust outlet, wherein the three-way conversion catalytic article comprises i) a first platinum group metal supported on a first support, and ii) a first substrate;
   b) a catalytic article located downstream of and in fluid communication with the first close coupled three-way conversion catalytic article, wherein the catalytic article comprises i) a second platinum group metal supported on a second support, and ii) a second substrate;
   c) a tail-pipe catalytic article comprising i) a third platinum group metal, a non-platinum group metal, or both, supported on one of ceria-zirconia, ceria, ceria-alumina, lanthana-zirconia, alumina-zirconia, a mixture of alumina and ceria, and a mixture of alumina and ceria-zirconia; and ii) a third substrate,
   wherein the loading of the third platinum group metal, if present, ranges from 1.0 g/ft$^3$ to 10.0 g/ft$^3$;
   wherein the non-platinum group metal, if present, is selected from nickel, copper, iron, manganese, and combination thereof, supported on a support, wherein the support is chosen from ceria component, zirconia component, and oxygen storage component, wherein the amount of the non-platinum group metal ranges from 0.1 wt. % to 15 wt. %; and
      wherein the tail-pipe catalytic article (c) is arranged downstream in fluid communication and from 1.0 foot to 10 feet away from the catalytic article (b) at a position chosen from before or behind a resonator, before or after a muffler, between the resonator and the muffler, inside the muffler, inside the resonator, and at a tail pipe end.

2. The catalyst system according to claim 1, wherein the amount of third platinum group metal is less than 10 wt. % of the total amount of the platinum group metal present in the catalyst system.

3. The catalyst system according to claim 1, wherein the loading of the first platinum group metal ranges from 50 g/ft$^3$ to 300 g/ft$^3$.

4. The catalyst system according to claim 1, wherein the loading of the second platinum group metal ranges from 1.0 g/ft$^3$ and 50.0 g/ft$^3$.

5. The catalyst system according to claim 1, wherein the loading of the third platinum group metal ranges from 1.0 g/ft$^3$ to 5.0 g/ft$^3$.

6. The catalyst system according to claim 1, wherein each of the first, second and third platinum group metal is platinum, palladium, rhodium, or any combination thereof.

7. The catalyst system according to claim 1, wherein the third platinum group metal is platinum.

8. The catalyst system according to claim 1, wherein, the automotive catalyst system further comprises:
   a) a first close coupled three-way conversion catalytic article in fluid communication with an engine exhaust outlet, wherein the article comprises from 50 g/ft$^3$ to 300 g/ft$^3$ of a first platinum group metal supported on a first support and a first substrate;
   b) a catalytic article located downstream of and in fluid communication with the first close coupled three-way conversion catalytic article, wherein the catalytic article comprises from 1.0 g/ft$^3$ to 50 g/ft$^3$ of a second platinum group metal supported on a second support, and a second substrate;
   c) a tail-pipe catalytic article comprising i) from 1.0 g/ft$^3$ to 5.0 g/ft$^3$ of a third platinum group metal, non-platinum group metal, or both supported on one of ceria-zirconia, ceria, ceria-alumina, lanthana-zirconia, alumina-zirconia, a mixture of alumina and ceria, and a mixture of alumina and ceria-zirconia; and ii) a third substrate,
   wherein the tail-pipe catalytic article (c) is arranged downstream in fluid communication and from 1.0 foot to 10 feet away from the catalytic article (b) at a position chosen from before or behind a resonator; before or after a muffler; between the resonator and the muffler; inside the muffler; inside the resonator; and at a tail pipe end.

9. The catalyst system according to claim 1, wherein the first or second support is chosen from an alumina component, an oxygen storage component, a zirconia component, and a ceria component.

10. The catalyst system according to claim 9, wherein the alumina component is chosen from alumina, lanthana-alumina, ceria-alumina, ceria-zirconia-alumina, zirconia-alumina, lanthana-zirconia-alumina, baria-alumina, baria-lanthana-alumina, baria-lanthana-neodymia-alumina, and combinations thereof.

11. The catalyst system according to claim 9, wherein the oxygen storage component is chosen from ceria-zirconia, ceria-zirconia-lanthana, ceria-zirconia-yttria, ceria-zirconia-lanthana-yttria, ceria-zirconia-neodymia, ceria-zirconia-praseodymia, ceria-zirconia-lanthana-neodymia, ceria-zirconia-lanthana-praseodymia, ceria-zirconia-lanthana-neodymia-praseodymia, and combinations thereof.

12. The catalyst system according to claim 9, wherein the ceria component is chosen from ceria and stabilized ceria with a cerium oxide content of at least 85% by weight, the ceria component optionally comprising a dopant chosen from zirconia, yttria, praseodymia, lanthana, neodymia, samaria, gadolinia, alumina, titania, baria, strontia, and combinations thereof, wherein the amount of the dopant ranges from 1.0 wt. % to 20.0 wt. %, based on the total weight of the ceria component.

13. The catalyst system according to claim 1, wherein the catalytic article (b) is an underfloor catalytic article or a second close coupled catalytic article.

14. The catalyst system according to claim 1, wherein the first close coupled three-way conversion catalytic article (a), the catalytic article (b), or both is a single layered or bi-layered catalytic article.

15. The catalyst system according to claim 14, wherein the first close coupled three-way conversion catalytic article (a), the catalytic article (b), or both is a bi-layered catalytic article comprising a bottom layer and a top layer, wherein the bottom, top layer, or both comprises a front zone and a rear zone.

16. The catalyst system according to claim 1, wherein the non-platinum group metal comprises a combination of nickel and copper, and wherein the amount of nickel is 10 wt. % and the amount of copper is 5.0 wt. %.

17. The catalyst system according to claim 1, wherein each of the first, second and third substrate is a ceramic substrate, a metal substrate, a coated ceramic foam substrate, a polymer foam substrate, or a woven fibre substrate.

18. The catalyst system according to claim 1, wherein the automotive catalyst system comprises:

a) a first close coupled three-way conversion catalytic article in fluid communication with an engine exhaust outlet, wherein the article comprises i) a bottom layer comprising from 90 g/ft$^3$ to 100 g/ft$^3$ of palladium supported on an alumina component and oxygen storage component, ii) a top layer comprising from 1.0 g/ft$^3$ to 10 g/ft$^3$ of rhodium supported on alumina component, and iii) a first substrate;

b) an underfloor catalytic article located downstream of and in fluid communication with the first close coupled three-way conversion catalytic article, wherein the article comprises i) from 1.0 g/ft$^3$ to 5.0 g/ft$^3$ of rhodium supported on an alumina component and oxygen storage component, and ii) a second substrate;

c) a tail-pipe catalytic article comprising i) from 1.0 g/ft$^3$ to 5.0 g/ft$^3$ of platinum supported on ceria-alumina, and ii) a third substrate, wherein the tail-pipe catalytic article (c) is arranged downstream in fluid communication and from 1.0 foot to 10 feet away from the catalytic article (b) at a position chosen from before or behind a resonator; before or after a muffler; between the resonator and the muffler; inside the muffler; inside the resonator; and at a tail pipe end.

19. The catalyst system according to claim 1, wherein the automotive catalyst system comprises:

a) a first close coupled three-way conversion catalytic article in fluid communication with an engine exhaust outlet, wherein the article is a bi-layered article comprising i) a bottom layer comprising from 90 g/ft$^3$ to 100 g/ft$^3$ of palladium supported on an alumina component and oxygen storage component, ii) a top layer comprising from 1.0 g/ft$^3$ to 10 g/ft$^3$ of rhodium supported on alumina component, and iii) a first substrate;

b) an underfloor catalytic article located downstream of and in fluid communication with the first close coupled three-way conversion catalytic article, wherein the article comprises i) from 1.0 g/ft$^3$ to 5.0 g/ft$^3$ of rhodium supported on an alumina component and oxygen storage component, and ii) a second substrate;

c) a tail-pipe catalytic article comprising i) from 1.0 g/ft$^3$ to 5.0 g/ft$^3$ of palladium supported on ceria-alumina; and ii) a third substrate, wherein the tail-pipe catalytic article (c) is arranged downstream in fluid communication and from 1.0 foot to 10 feet away from the catalytic article (b) at a position chosen from before or behind a resonator; before or after a muffler; between the resonator and the muffler; inside the muffler; inside the resonator; and at a tail pipe end.

20. The catalyst system according to claim 1, wherein the automotive catalyst system comprises:

a) a first close coupled three-way conversion catalytic article in fluid communication with an engine exhaust outlet, wherein the article comprises i) a bottom layer comprising from 90 g/ft$^3$ to 100 g/ft$^3$ of palladium supported on an alumina component and oxygen storage component, ii) a top layer comprising from 1.0 g/ft$^3$ to 10 g/ft$^3$ of rhodium supported on alumina component, and iii) a first substrate;

b) an underfloor catalytic article located downstream of and in fluid communication with the first close coupled three-way conversion catalytic article, wherein the article comprises i) from 1.0 g/ft$^3$ to 5.0 g/ft$^3$ of rhodium supported on an alumina component and oxygen storage component, and ii) a second substrate;

c) a tail-pipe catalytic article comprising i) 0.5 wt. % of CuO and 10 wt. % of NiO supported on ceria and lanthana-zirconia; and ii) a third substrate, wherein the tail-pipe catalytic article (c) is arranged downstream in fluid communication and from 1.0 foot to 10 feet away from the catalytic article (b) at a position chosen from before or behind a resonator; before or after a muffler; between the resonator and the muffler; inside the muffler; inside the resonator; and at a tail pipe end.

21. A method of reducing hydrocarbons, carbon monoxide, and nitrogen oxide levels in a gaseous exhaust stream, the method comprising contacting the gaseous exhaust stream with the catalyst system according to claim 1.

22. A method of reducing the carbon monoxide level in a gaseous exhaust stream, the method comprising contacting the gaseous exhaust stream with the catalyst system according to claim 1.

* * * * *